(12) United States Patent
Roets et al.

(10) Patent No.: US 10,922,309 B2
(45) Date of Patent: Feb. 16, 2021

(54) DISTRIBUTED LEDGER INTERACTION SYSTEM AND METHODS

(71) Applicant: Dragonchain, Inc., Bellevue, WA (US)

(72) Inventors: Joe Roets, Bellevue, WA (US); Alex Benedetto, Kirkland, WA (US); Adam Crowder, Kirkland, WA (US); Roby Daquilante, Port Orchard, WA (US); Noah Gribbin, Seattle, WA (US); Regan Karlewicz, Bellevue, WA (US); Daniel Luedke, Seattle, WA (US); David Rigby, Lynnwood, WA (US); Dean Shelton, Mukilteo, WA (US)

(73) Assignee: DRAGONCHAIN, INC., Bellevue, WA (US)

( * ) Notice: Subject to any disclaimer, the term of this patent is extended or adjusted under 35 U.S.C. 154(b) by 0 days.

(21) Appl. No.: 16/882,278

(22) Filed: May 22, 2020

(65) Prior Publication Data
US 2020/0285635 A1    Sep. 10, 2020

Related U.S. Application Data

(63) Continuation-in-part of application No. 16/195,261, filed on Nov. 19, 2018, now Pat. No. 10,666,426.

(51) Int. Cl.
*G06F 16/23*   (2019.01)
*G06F 16/27*   (2019.01)

(52) U.S. Cl.
CPC .......... *G06F 16/2379* (2019.01); *G06F 16/27* (2019.01)

(58) Field of Classification Search
CPC .............................. G06F 16/27; G06F 16/2379

USPC ........................................................ 713/189
See application file for complete search history.

(56) References Cited

U.S. PATENT DOCUMENTS

| | | | |
|---|---|---|---|
| 9,569,439 B2 | 2/2017 | Davis et al. |
| 9,569,771 B2 | 2/2017 | Lesavich et al. |
| 9,646,029 B1 | 5/2017 | Baird, III |
| 9,672,499 B2 | 6/2017 | Yang et al. |
| 9,747,586 B1 | 8/2017 | Frolov et al. |
| 10,050,959 B2 | 8/2018 | Soon-Shiong et al. |
| 10,063,568 B1 | 8/2018 | Ford et al. |
| 10,068,397 B2 | 9/2018 | Day et al. |
| 10,121,025 B1 | 11/2018 | Rice |
| 10,135,607 B1 | 11/2018 | Roets |
| 10,268,829 B2 | 4/2019 | Roets et al. |

(Continued)

OTHER PUBLICATIONS

Yu, Lian, et al. "Smart-contract execution with concurrent block building." 2017 IEEE Symposium on Service-Oriented System Engineering (SOSE). IEEE, 2017. (Year: 2017).*

(Continued)

*Primary Examiner* — Syed A Zaidi
(74) *Attorney, Agent, or Firm* — AEON Law, PLLC; Adam L. K. Philipp; Jonathan E. Olson

(57) ABSTRACT

In some variants systems and methods are disclosed that allow a smart contract or other device-executable code sequence to be triggered as an automatic and conditional response to a change of a data element that is used by the code sequence. By using user-identified values as state variables that trigger execution in a blockchain or similar controlled environment, for example, cascading processes can be incrementally and reversibly automated without any necessity for coordination and without compromising security.

20 Claims, 22 Drawing Sheets

(56) References Cited

U.S. PATENT DOCUMENTS

| | | |
|---|---|---|
| 2008/0015962 A1* | 1/2008 | Smith ................ G06Q 30/0641 705/35 |
| 2012/0020476 A1 | 1/2012 | Billet et al. |
| 2012/0095908 A1 | 4/2012 | Barrie et al. |
| 2013/0061288 A1 | 3/2013 | Paim |
| 2016/0260095 A1 | 9/2016 | Ford |
| 2016/0335533 A1* | 11/2016 | Davis ........................ G06F 9/44 |
| 2017/0109638 A1 | 4/2017 | Marcu et al. |
| 2017/0109639 A1 | 4/2017 | Marcu et al. |
| 2017/0109668 A1 | 4/2017 | Marcu et al. |
| 2017/0116693 A1 | 4/2017 | Rae et al. |
| 2017/0177855 A1* | 6/2017 | Costa Faidella ...... H04L 9/3236 |
| 2017/0287090 A1 | 10/2017 | Hunn et al. |
| 2017/0364698 A1 | 12/2017 | Goldfarb et al. |
| 2018/0097841 A1 | 4/2018 | Stolarz et al. |
| 2018/0129955 A1 | 5/2018 | Saxena et al. |
| 2018/0157825 A1 | 6/2018 | Eksten et al. |
| 2018/0167198 A1 | 6/2018 | Muller et al. |
| 2018/0183606 A1 | 6/2018 | High et al. |
| 2018/0183687 A1 | 6/2018 | Dementev et al. |
| 2018/0218176 A1* | 8/2018 | Voorhees .............. H04L 9/3297 |
| 2018/0225640 A1* | 8/2018 | Chapman ........... G06Q 20/3827 |
| 2018/0225660 A1* | 8/2018 | Chapman ........... G06Q 20/3827 |
| 2018/0227116 A1* | 8/2018 | Chapman .............. H04L 9/0643 |
| 2018/0239897 A1* | 8/2018 | Ventura ................... G06F 21/57 |
| 2018/0253451 A1* | 9/2018 | Callan ................... H04L 63/123 |
| 2018/0300476 A1 | 10/2018 | Guillama et al. |
| 2018/0307859 A1* | 10/2018 | LaFever ................. G16H 10/60 |
| 2018/0332070 A1 | 11/2018 | Ford et al. |
| 2018/0332072 A1 | 11/2018 | Ford et al. |
| 2019/0081789 A1* | 3/2019 | Madisetti ............. G06Q 20/401 |
| 2020/0274389 A1* | 8/2020 | Islam ................... H04L 9/3239 |

OTHER PUBLICATIONS

NPL Search Results (Year: 2020).*

\* cited by examiner

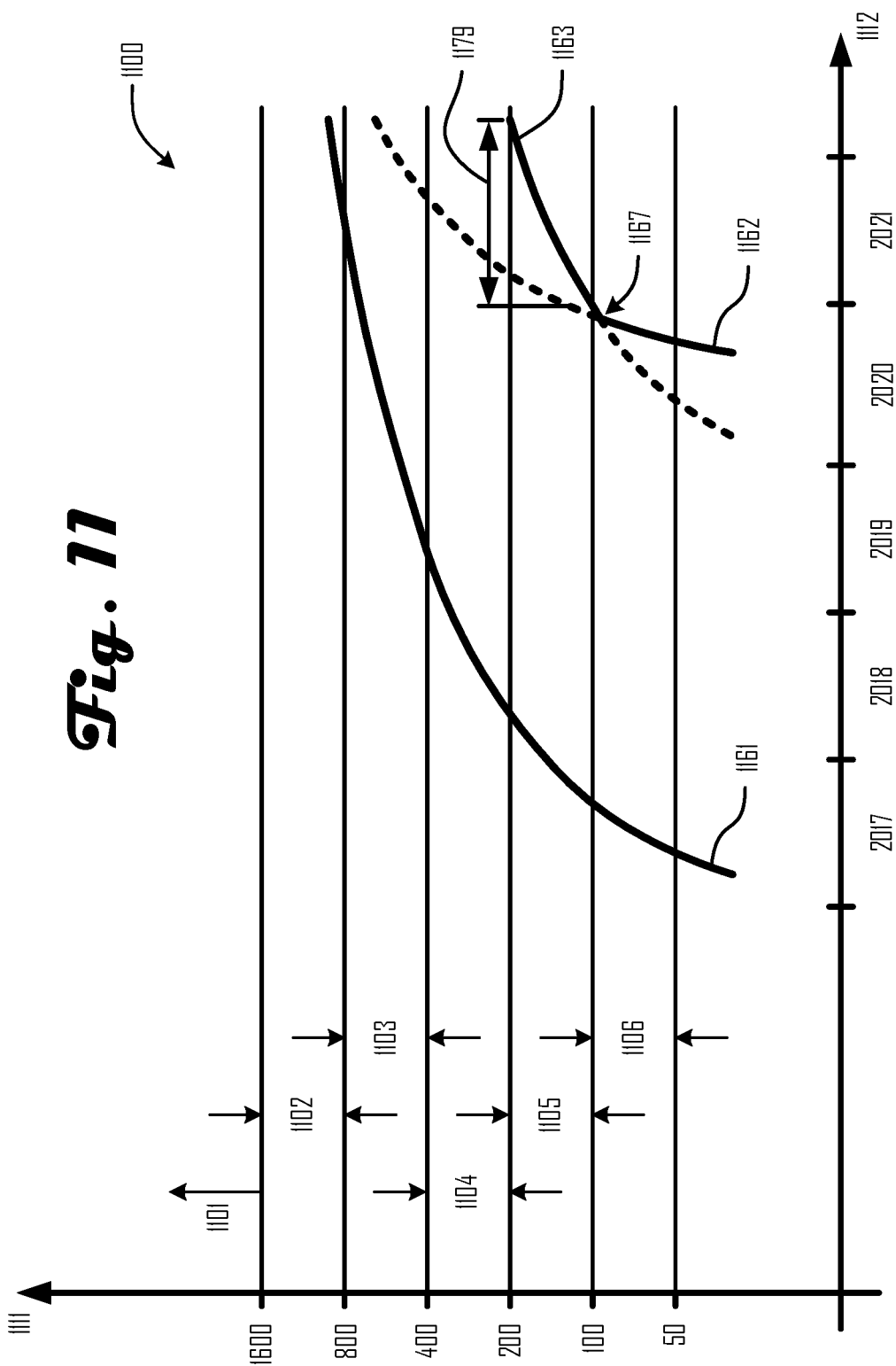

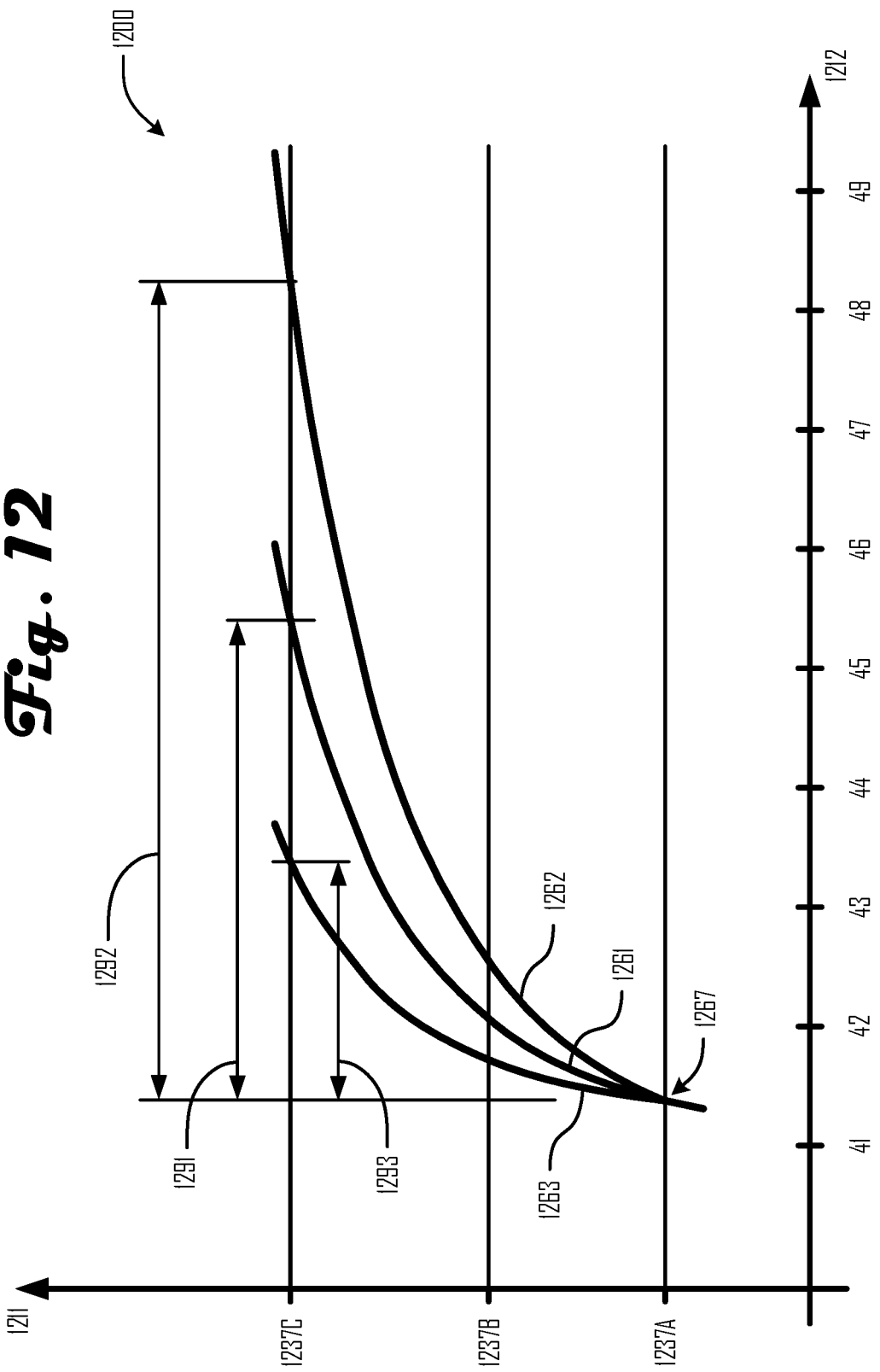

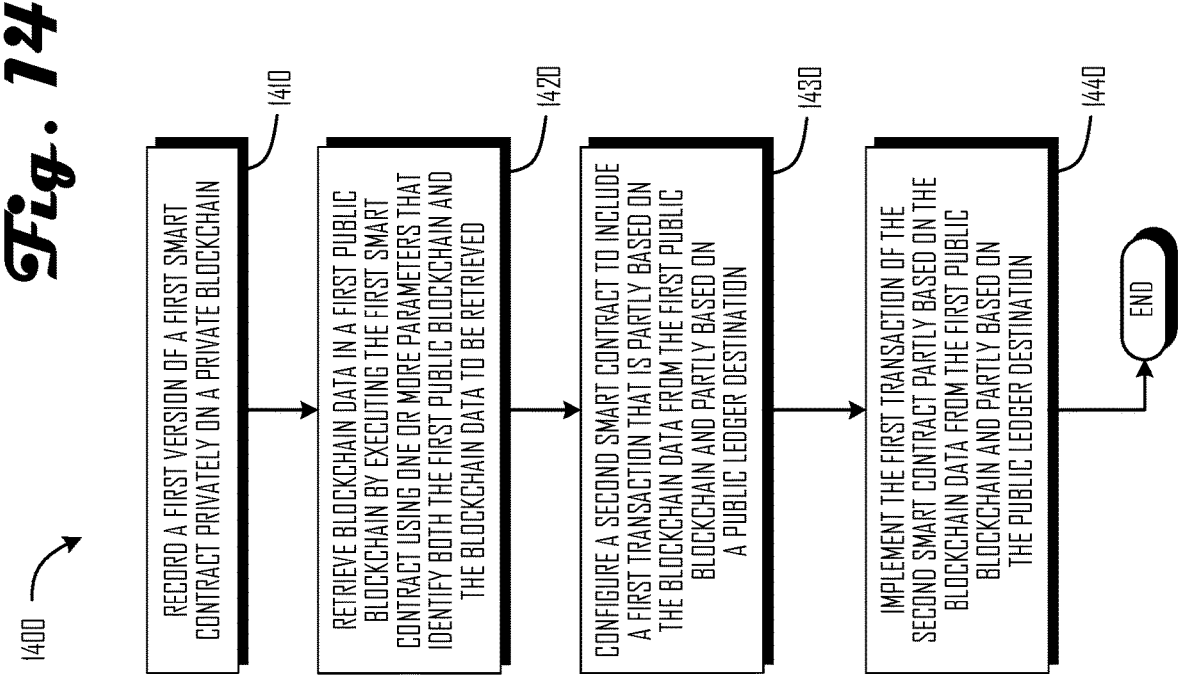
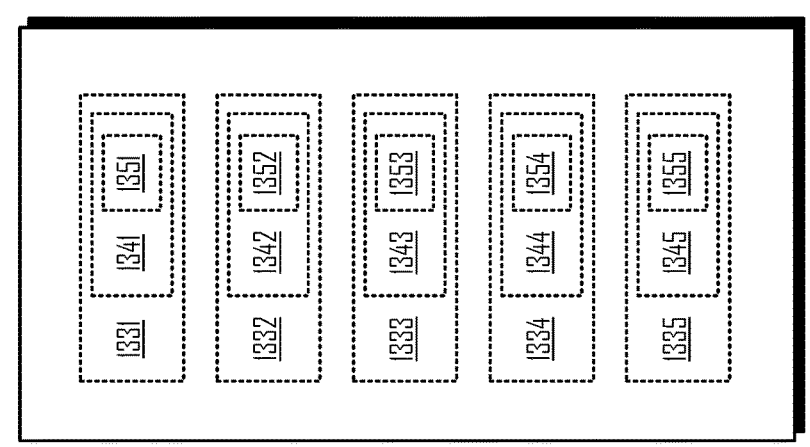

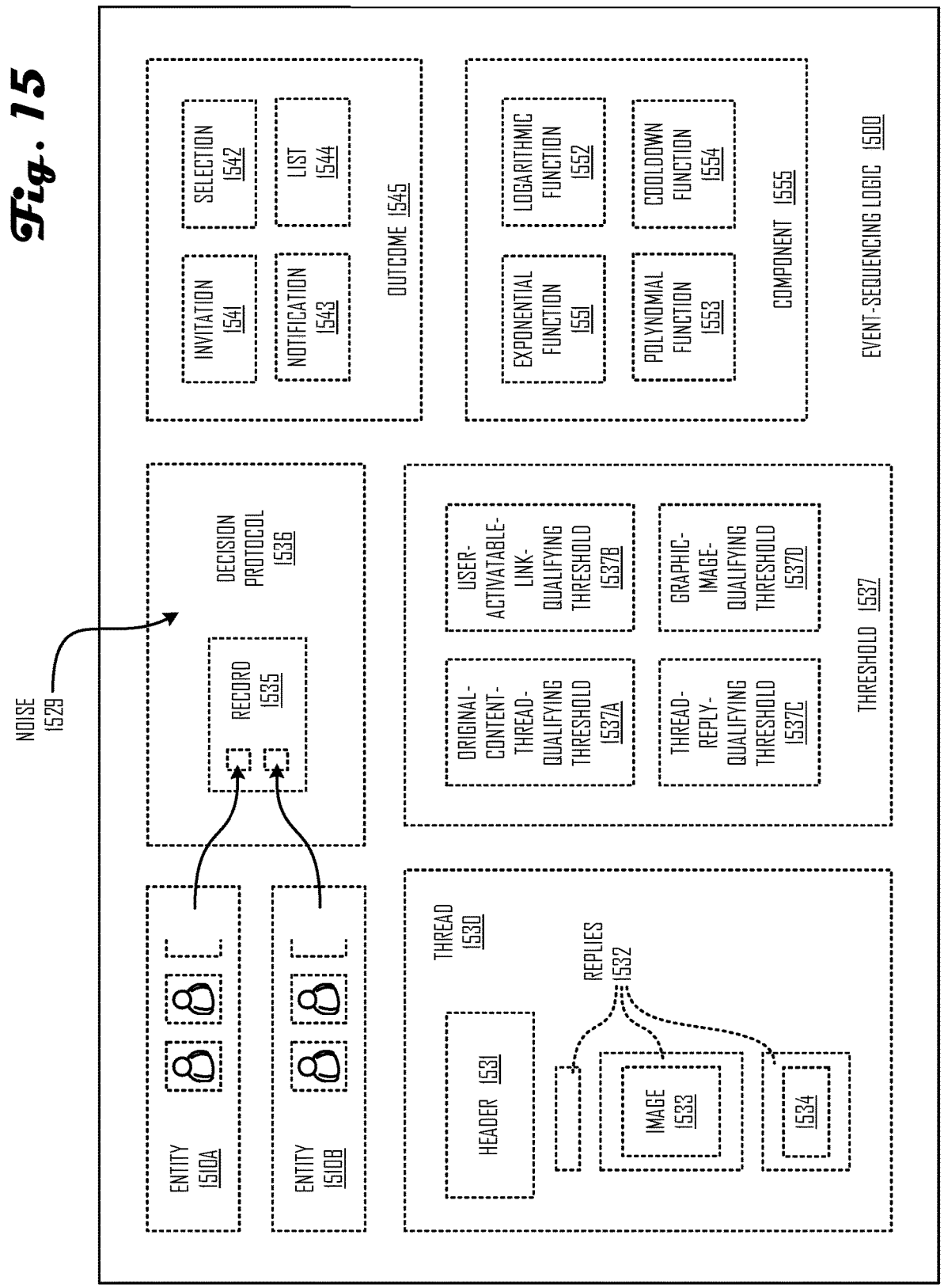

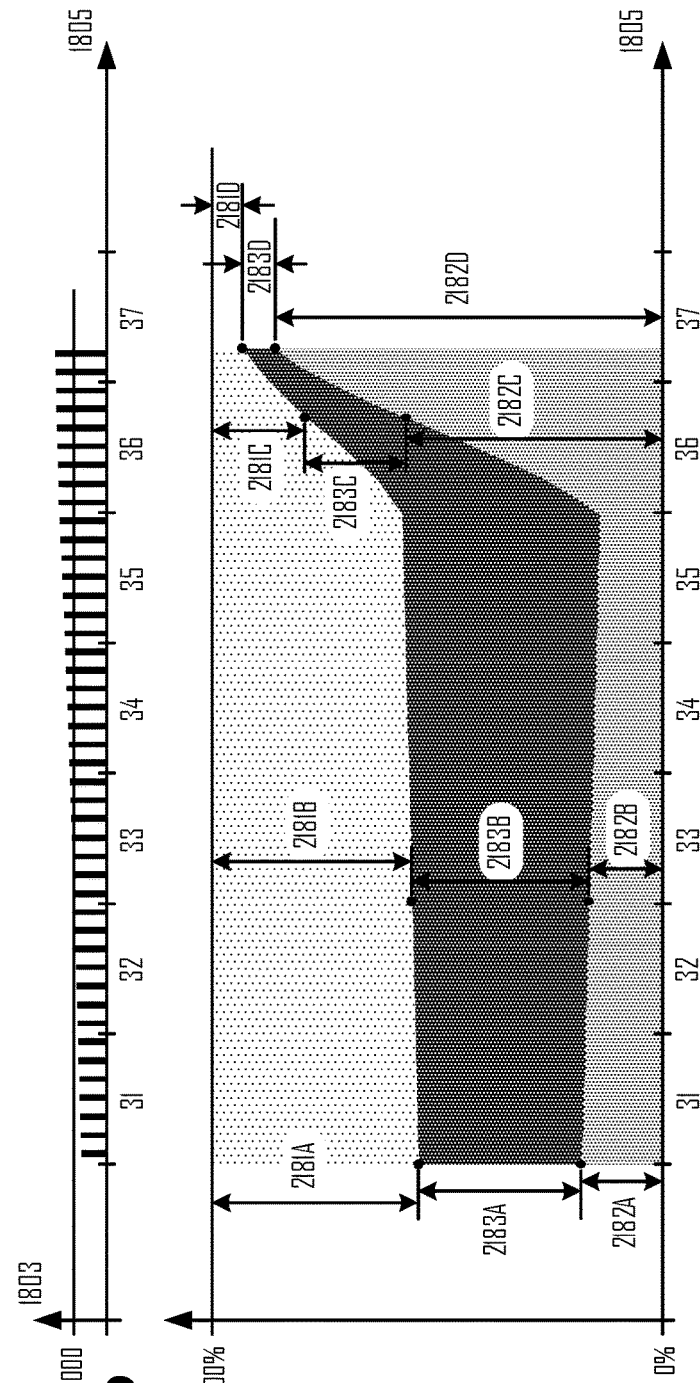

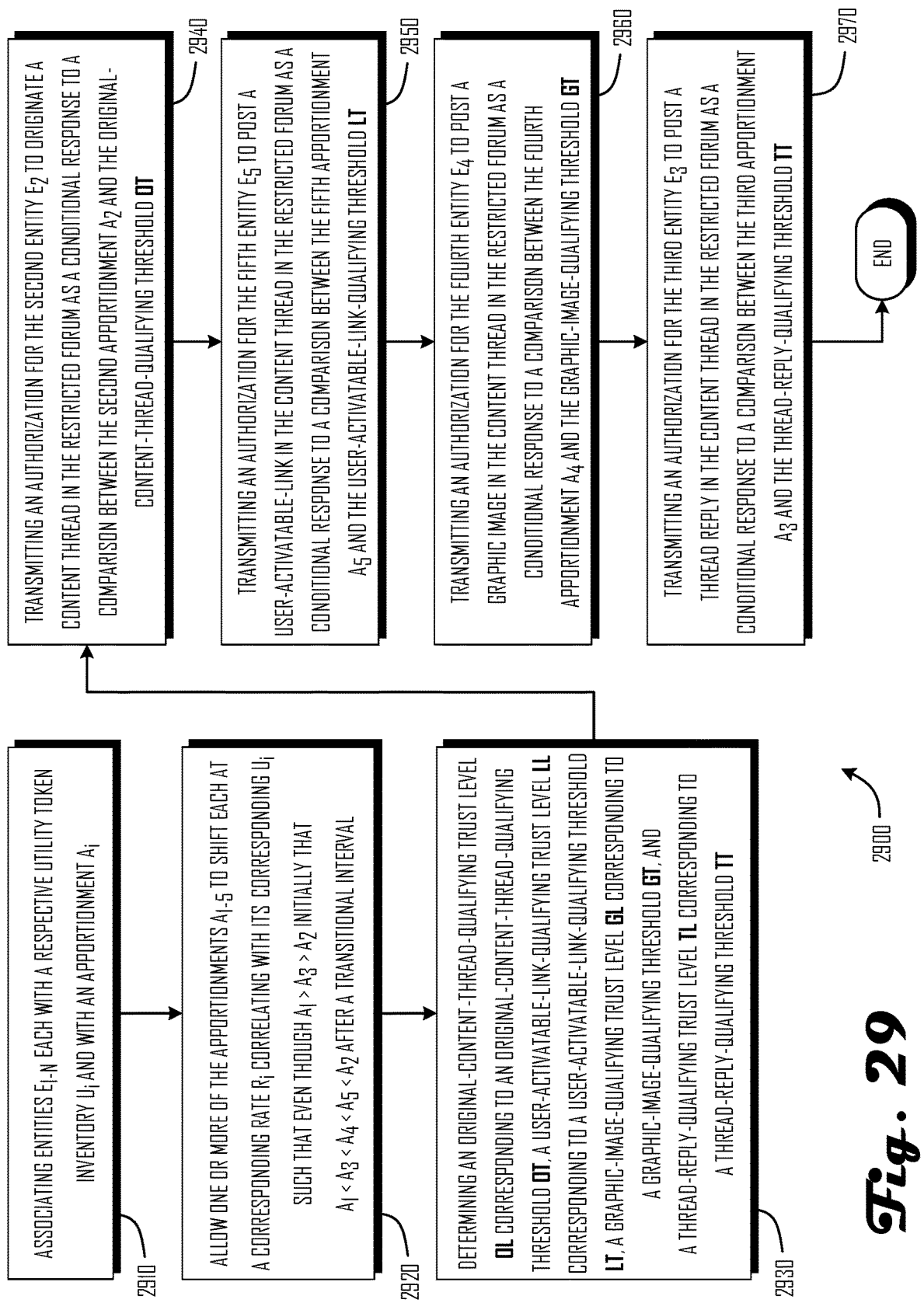

DISTRIBUTED LEDGER INTERACTION SYSTEM AND METHODS

RELATED APPLICATIONS

The instant application is a continuation in part (CIP) of U.S. application Ser. No. 16/195,261 ("Distributed Ledger Interaction System and Methods") filed 19 Nov. 2018, which is a continuation of U.S. Pat. No. 10,135,607 ("Distributed Ledger Interaction System and Methods") filed 10 Aug. 2018. These are incorporated by reference in their entirety for all purposes.

BRIEF DESCRIPTION OF THE DRAWINGS

FIG. 11 is a semi-log plot showing how trustworthiness can increase over time in which one or more improved vetting technologies may be incorporated.

FIG. 12 is another plot showing how trustworthiness can increase over time in which one or more improved vetting technologies may be incorporated.

FIG. 13 depicts special-purpose transistor-based circuitry in which one or more improved technologies may be incorporated.

FIG. 14 depicts an operational flow in which one or more improved technologies may be incorporated.

FIG. 15 depicts event-sequencing logic including one or more decision protocols in which one or more improved technologies may be incorporated.

FIG. 18 depicts an apportionment to an entity that increases in trust over a period of several weeks to describe a context in which such growth is so slow that the entity becomes untrusted in this period.

FIG. 19 depicts an apportionment to an initially untrusted entity that increases in trust over the same period of several weeks to describe how such growth is so fast that the entity becomes trusted in this period.

FIG. 20 depicts an apportionment to an intermediate entity that increases in trust moderately to exemplify how such an entity can be neither trusted nor untrusted both before and after the same exemplary period of several weeks.

FIG. 21 depicts time-varying normalized apportionments reflecting the raw apportionments depicted in FIGS. 18-20 over the same period of several weeks.

FIG. 29 depicts another operational flow in which one or more improved technologies may be incorporated for data filtering configured to protect a restricted forum or its participants from malicious uploads or participants (or both).

DETAILED DESCRIPTION

Figure 1:
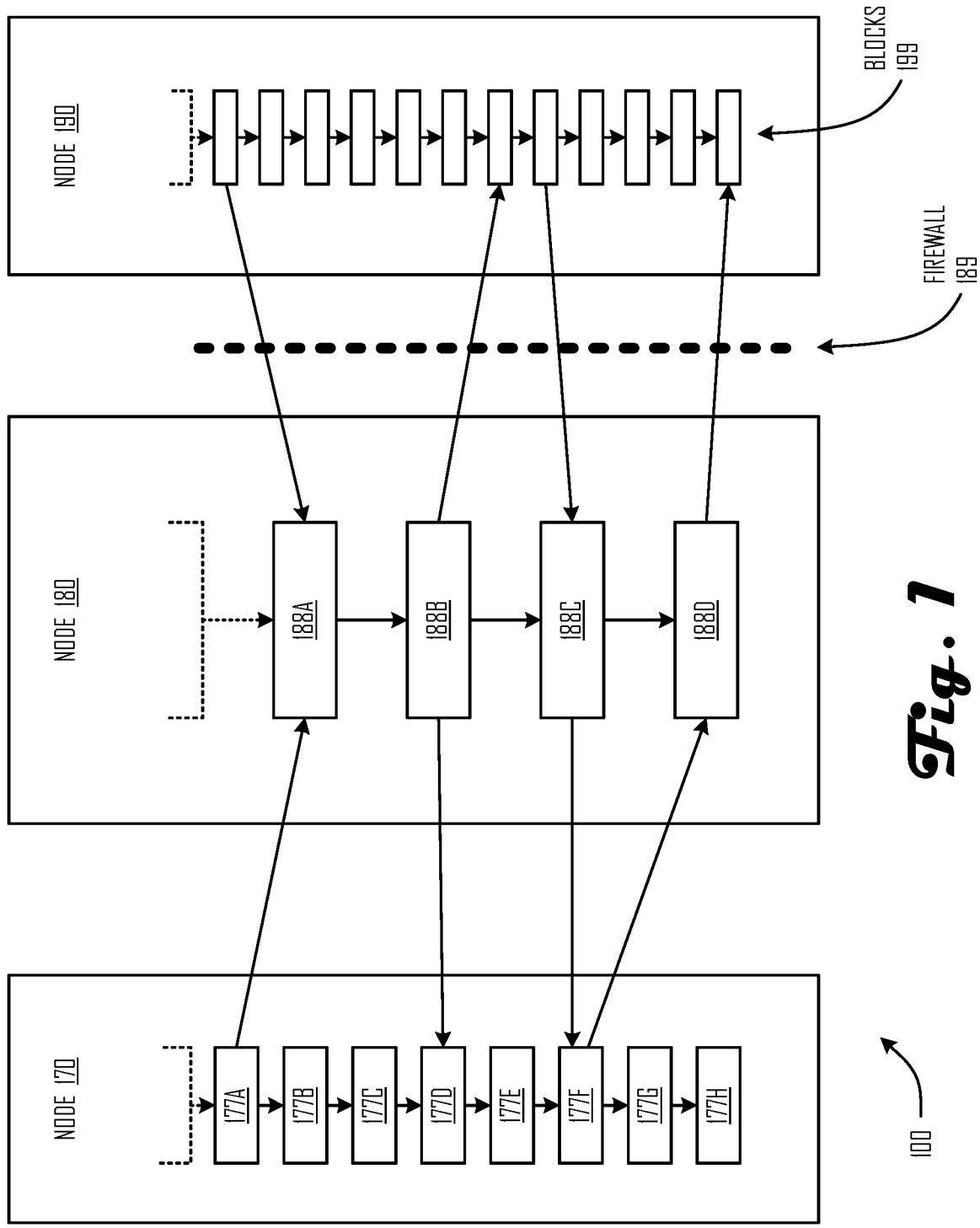
FIG. 1 schematically illustrates a system in which respective distributed ledger nodes interact according to one or more improved technologies.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "achieved," "after," "aggregate," "any," "application-specific," "assigned," "associated," "at least," "authorized," "automatic," "available," "based on," "because," "by changing," "changed," "complete," "comprising," "conditional," "configured," "correlating," "cryptographic," "current," "detected," "digital," "directly," "disabled," "distributed," "enabled," "established," "executed," "first," "from," "generated," "higher," "human," "hybrid," "implemented," "inalterable," "included," "indicated," "installed," "integrated," "intermediate," "invoked," "jointly," "last-written," "malicious," "manually," "monotonic," "more," "mutually," "negative," "nominal," "not," "obtained," "of," "otherwise," "output," "particular," "partly," "positively," "preliminary," "primary," "prior," "private," "processed," "prospectively," "public," "quantified," "received," "remote," "replaced," "requester-specified," "residing," "responsive," "resulting," "second," "secondary," "sequenced," "shorter," "signaling," "single," "smart," "so as," "special-purpose," "state-change-responsive," "stepwise," "subsequent," "suitability," "temporal," "third," "through," "to," "transistor-based," "triggered," "undue," "updated," "upon," "user-identified," "utility," "variable," "version-controlled," "via," "wherein," "without," or other such descriptors herein are used in their normal yes-or-no sense, not merely as terms of degree, unless context dictates otherwise. As used herein "inventory-type" instruction sets are those that primarily implement asset transfers or verifications thereof, moving quantities among accounts rather than changing them. As used herein "data transformative" instruction sets are those that primarily implement other kinds of computations. Although one of these types of instruction sets may invoke the other as a subroutine, only very rarely is a single code component of instructions a true hybrid.

In light of the present disclosure those skilled in the art will understand from context what is meant by "remote" and by other such positional descriptors used herein. Likewise they will understand what is meant by "partly based" or other such descriptions of dependent computational variables/signals. "Numerous" as used herein refers to more than one dozen. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein values are "apportionments" if they quantify reputation, risk, trustworthiness, or similar attributes of respective entities with a scalar magnitude so as to facilitate relative ranking therebetween. This may include cardinal numbers but not ordinal rankings insofar that the latter are already ranked.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 schematically illustrates a system 100 in which respective distributed ledger nodes 170, 180, 190 interact. Each node primarily includes a blockchain or other distributed ledger, each occasionally progressing downward with the addition of a new block. As shown node 170 includes an oldest block 177A (built upon one or more predecessor blocks), a newest block 177H, and other blocks 177B-G between them. Node 180 likewise includes an oldest block 188A, a newest block 188D, and other blocks 188B-C between them. Node 190 likewise includes a chain of blocks. As further described below, node 180 has been constructed by a series of interactions with these other nodes 170, 190. One or more smart contracts of node 180 (see FIG. 6) read one or more elements from block 177A and from a particular one of the blocks 199 of node 190, combining the elements and recording the result in block 188A. Likewise one or more smart contracts provided one or more elements of block 188B to be recorded or otherwise reflected in block 177D and in a later one of the blocks 199 of node 190. Thereafter one or more elements of the then-newest block 199 of node 190 was read and used in generating block 188C, one or more elements of which were provided for use in node 170. That use allowed block 177F to be recorded, and one or more elements (e.g., transactions) thereof was recorded in block 188D and relayed to the now-newest block 199 of node 190. Insofar that smart contracts or other software agents may be executing at any or all of these nodes 170, 180, 190, a firewall 189 may be used to protect node 180 from pernicious code components or other forms of intrusion (e.g., from node 190). To guard against other forms of attack (e.g., from visitors), additional constraints may be imposed by one or more servers (e.g., of a network containing a private or hybrid public/private node 180).

As used herein, a plain reference numeral (e.g., like 177) may refer generally to a member of a class of items (e.g., like ledger blocks) exemplified with a hybrid numeral (e.g., like 177A) and it will be understood that every item identified with a hybrid numeral is also an exemplar of the class. Moreover although a reference numeral shared between figures refers to the same item, most figures depict respective embodiments.

Figure 2:
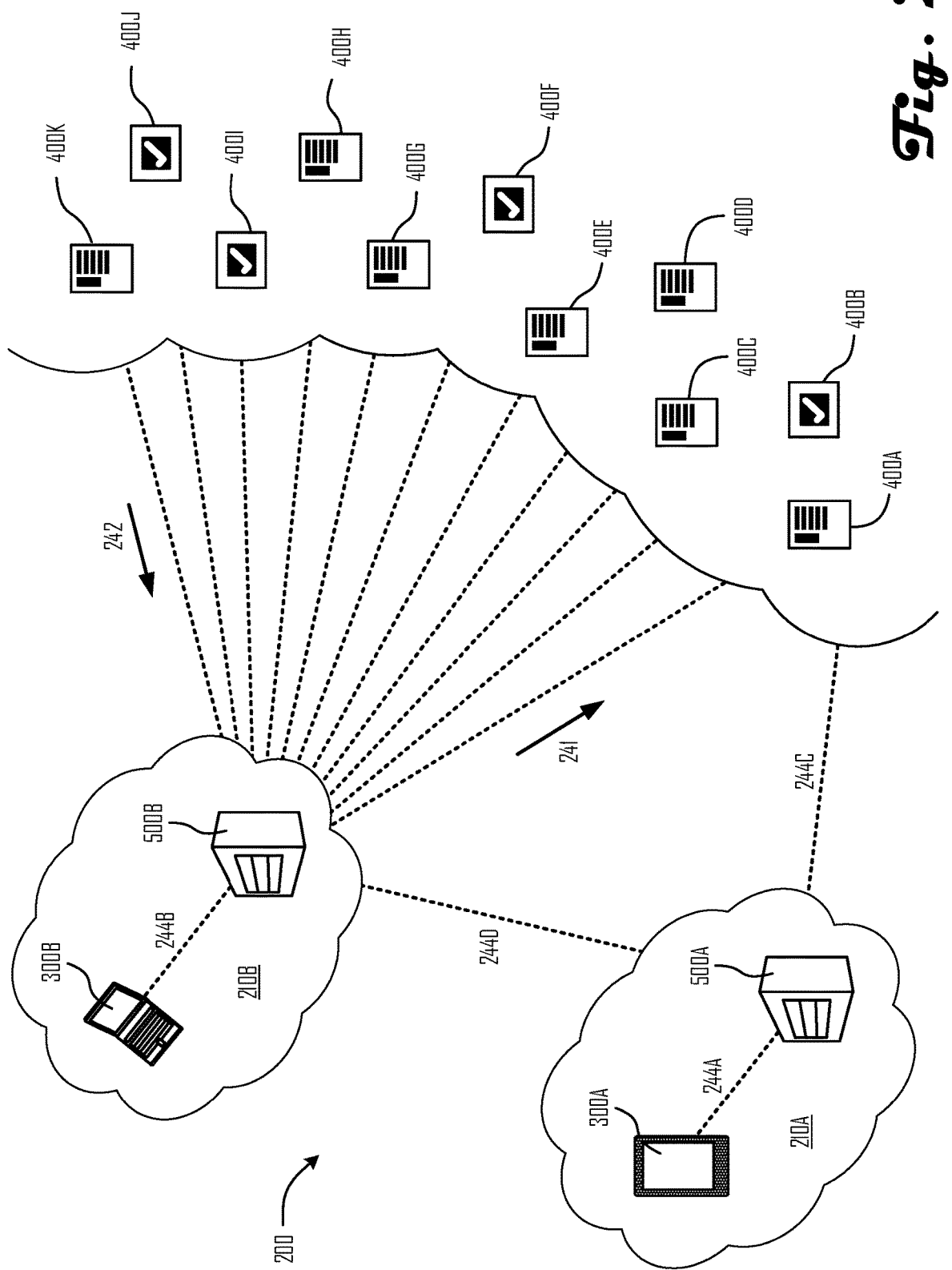
FIG. 2 schematically illustrates a system in which respective users or other entities interact with one another and with participating mining rigs or similar distributed devices in which one or more improved technologies may be incorporated.

FIG. 2 schematically illustrates a system 200 in which respective entities 210A-B interact with one another and with participating mining rigs 400K or similar distributed devices 400A-J many of which are, at various times, able to implement a transaction 241 or confirm an asset transfer or other occurrence as described below (e.g., by confirmations 242). In some variants a private entity 210A comprises one or more node management servers 500A that interact with one or more client devices 300A thereof (e.g., via respective instances of linkage 244A). Likewise a public or collective entity 210B comprises one or more node management servers 500B that interact with one or more client devices 300B thereof (e.g., via respective instances of linkage 244B). In some instances (e.g., in response to interactions via linkages 244C-D) the entities 210A-B may cooperate so that updates (e.g., indicia of dispensations, distributed ledger recordations, or other events) to values maintained at (one or more instances of) server 500B are received and so that adequately timely confirmations to those updates can occur in a decentralized fashion. In an instance where node 170 is distributed across multiple servers 500B in a proof-of-work architecture, for example, numerous proof-of-work blockchain nodes 400A, 400C, 400D, 400E, 400G, 400H, 400K (e.g., each implementing a mining rig) may validate changes to node 180 (e.g., by correctly identifying which block 177H was added last) so as to maintain or rebuild consensus.

Alternatively or additionally, such consensus may be maintained or rebuilt using numerous (proof-of-stake or other) secure blockchain nodes 400B, 400F, 400I, 400J not configured as a mining rig may validate changes to node 180 in other blockchain proof architectures currently in public use.

Figure 3:
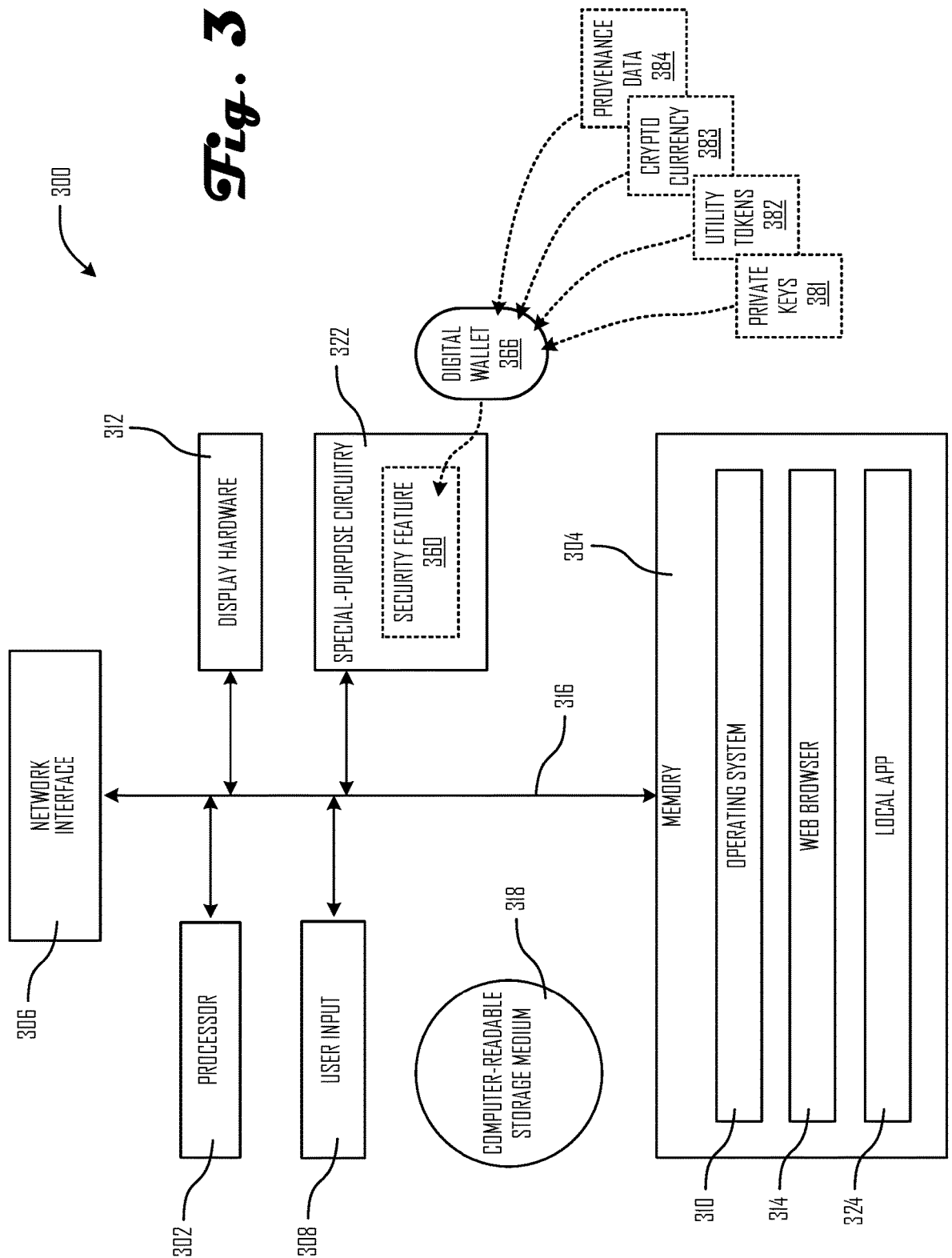
FIG. 3 depicts a client device in which one or more improved technologies may be incorporated.

Referring now to FIG. 3, there is shown a client device 300 in which one or more technologies may be implemented. Device 300 may include one or more instances of processors 302, memory 304, user inputs 308, and display hardware 312 all interconnected along with the network interface 306 via a bus 316. One or more network interfaces 306 allow device 300 to connect via the Internet or other networks to or within entities 210 of FIG. 2). Memory 304 generally comprises a random access memory ("RAM"), a read-only memory ("ROM"), and a permanent mass storage device, such as a disk drive.

Memory 304 may contain one or more instances of operating systems 310, web browsers 314, and local apps 324. These and other software components may be loaded from a non-transitory computer-readable storage medium 318 into memory 304 of the client device 300 using a drive mechanism (not shown) associated with a non-transitory computer-readable storage medium 318, such as a floppy disc, tape, DVD/CD-ROM drive, flash card, memory card, or the like. In some embodiments, software components may also be loaded via the network interface 306, rather than via a computer-readable storage medium 318. Special-purpose circuitry 322 may, in some variants, include some or all of the event-sequencing logic described below (e.g., in a peer-to-peer implementation) and one or more security features 360 (e.g., a fob or similar security apparatus).

In some contexts, security feature 360 may implement or otherwise interact with a removable or other digital wallet 366. Such wallets may (optionally) each include one or more instances of private keys 381, of utility tokens 382, of crypto currency 383, of provenance data 384, or of device-executable code snippets (e.g., smart contracts) or the like as described below. In some embodiments client device 300 may include many more components than those shown in FIG. 3, but it is not necessary that all conventional components be shown in order to disclose an illustrative embodiment.

Figure 4:
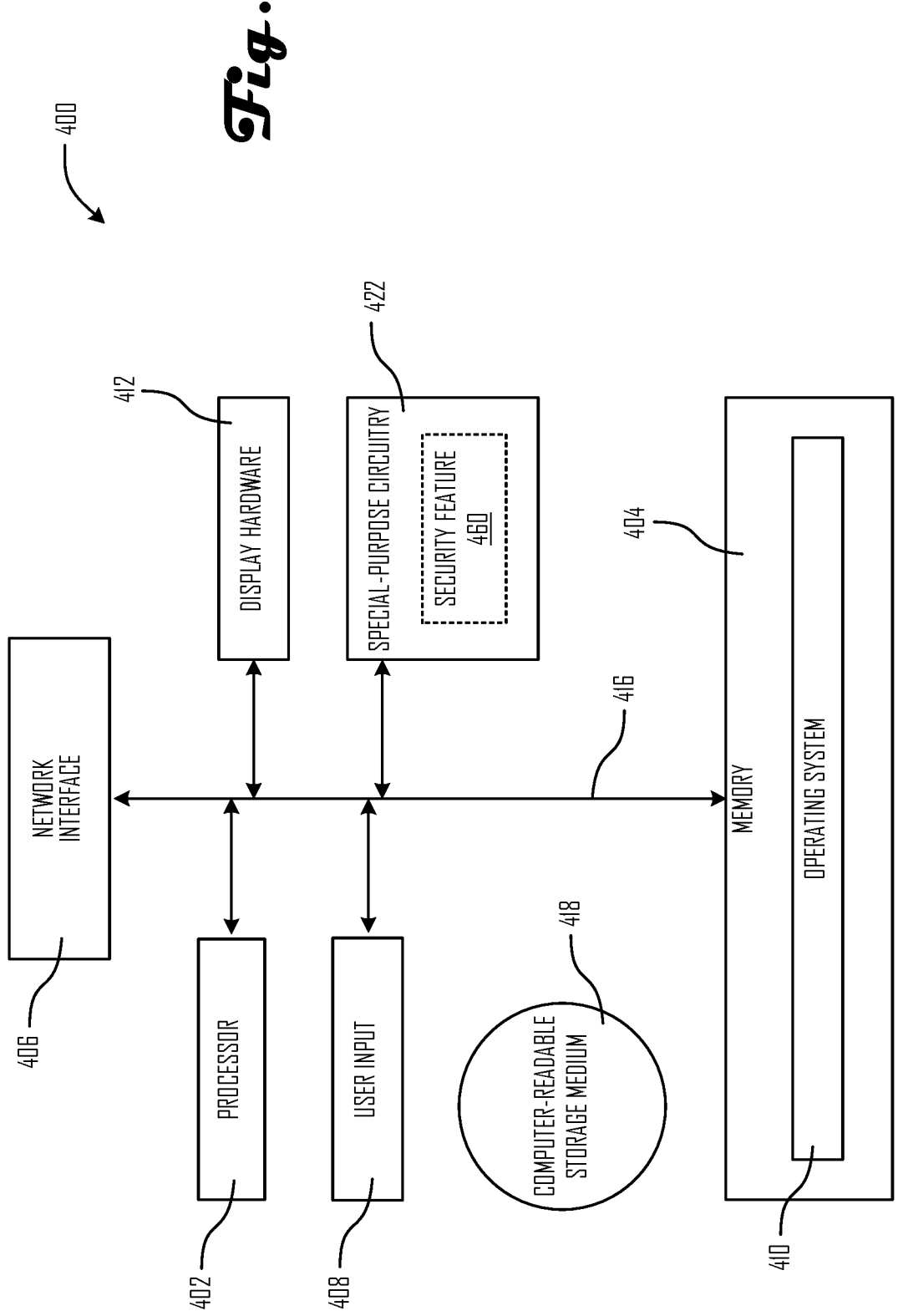
FIG. 4 depicts a distributed ledger verification device in which one or more improved technologies may be incorporated.

Referring now to FIG. 4, there is shown a distributed ledger verification device 400 like those of FIG. 2. Device 400 may include one or more instances of processors 402, memory 404, user inputs 408, and display hardware 412 all interconnected along with the network interface 406 via a bus 416. One or more network interfaces 406 allow device 400 to connect via the Internet or other networks to or within entities 210 of FIG. 2). Memory 404 generally comprises a random access memory ("RAM"), a read-only memory ("ROM"), and a permanent mass storage device, such as a disk drive.

Memory 404 may contain one or more instances of operating systems 410 and special-purpose software. These and other software components may be loaded from a non-transitory computer-readable storage medium 418 into memory 404 of the client device 400 using a drive mechanism (not shown) associated with a non-transitory computer-readable storage medium 418, such as a floppy disc, tape, DVD/CD-ROM drive, flash card, memory card, or the like. In some embodiments, software components may also be loaded via the network interface 406, rather than via a computer-readable storage medium 418. Special-purpose circuitry 422 may, in some variants, include some or all of the event-sequencing logic described below (e.g., in a peer-to-peer implementation) and one or more security features 460 (e.g., specially configured graphics processors or trusted entity private keys). In some embodiments client device 400 may include many more components than those shown in FIG. 4, but it is not necessary that all conventional components be shown in order to disclose an illustrative embodiment.

Figure 5:
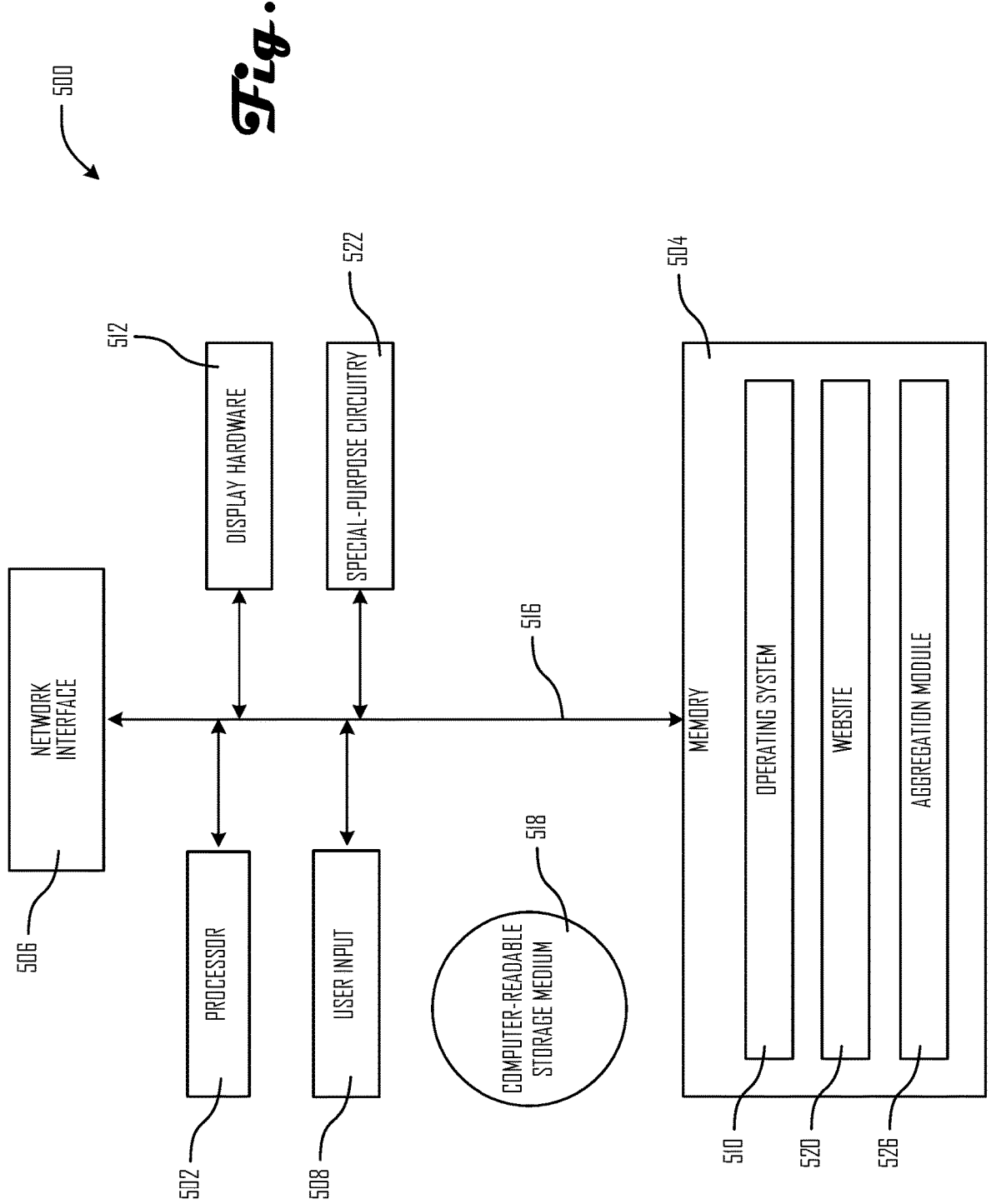
FIG. 5 depicts a server in which one or more improved technologies may be incorporated.

Referring now to FIG. 5, there is shown an exemplary server 500 like those of FIG. 2. Device 500 may include one or more instances of processors 502, memory 504, user inputs 508, and display hardware 512 all interconnected along with the network interface 506 via a bus 516. One or more network interfaces 506 allow device 500 to connect via the Internet or other networks to or within entities 210 of FIG. 2). Memory 504 generally comprises a random access memory ("RAM"), a read-only memory ("ROM"), and a permanent mass storage device, such as a disk drive.

Memory 504 may contain one or more instances of operating systems 510, hosted websites 520, and aggregation modules 526. These and other software components may be loaded from a non-transitory computer-readable storage medium 518 into memory 504 of the client device 500 using a drive mechanism (not shown) associated with a non-transitory computer-readable storage medium 518, such as a floppy disc, tape, DVD/CD-ROM drive, flash card, memory card, or the like. In some embodiments, software components may also be loaded via the network interface 506, rather than via a computer-readable storage medium 518. Special-purpose circuitry 522 may, in some variants, include some or all of the event-sequencing logic described below (e.g., in a peer-to-peer implementation) and one or more security features 560 (e.g., a firewall 189). In some embodiments client device 500 may include many more components than those shown in FIG. 5, but it is not necessary that all conventional components be shown in order to disclose an illustrative embodiment.

Figure 6:
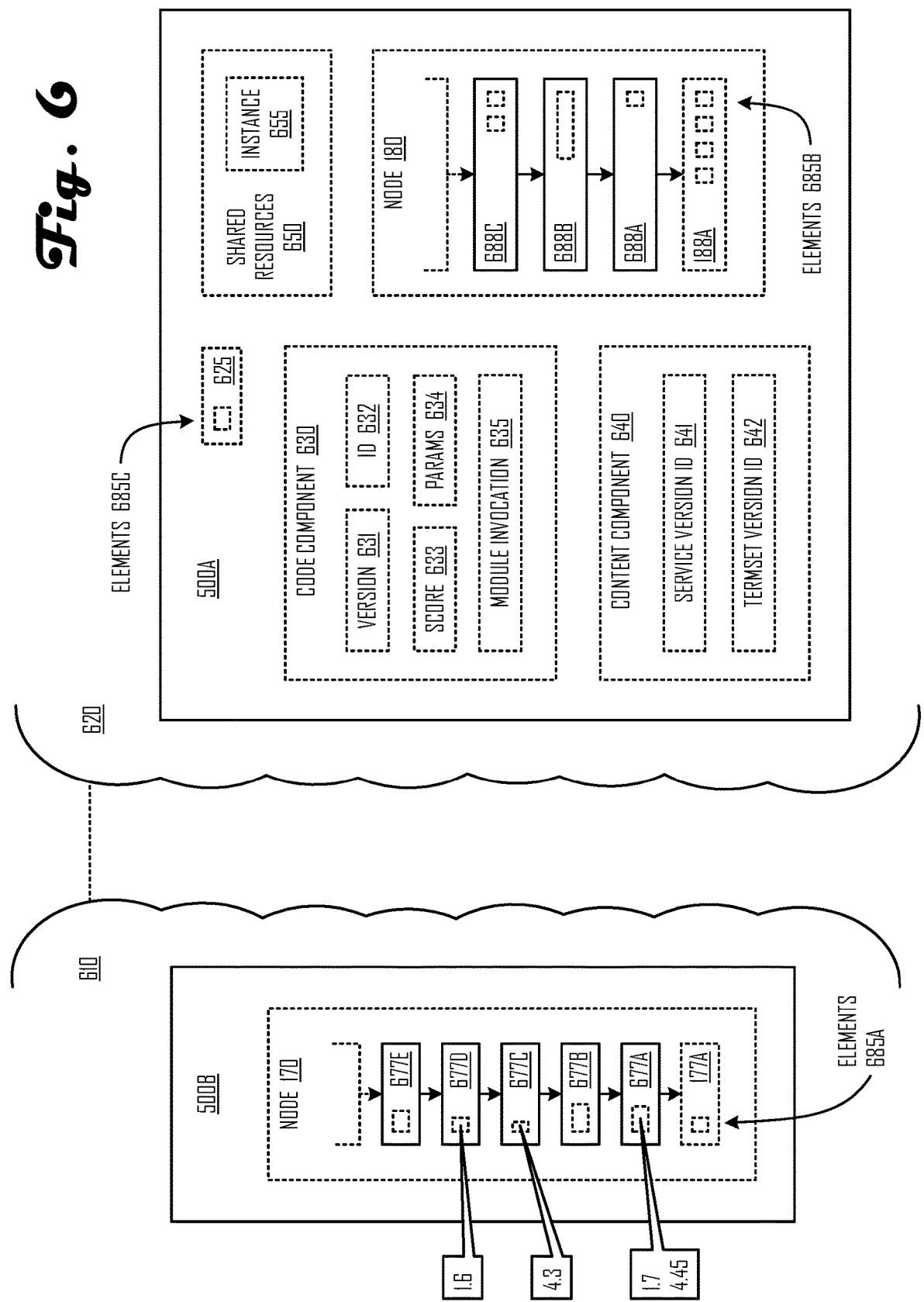
FIG. 6 depicts an earlier state of (a variant of) the system of FIG. 1.

FIG. 6 depicts an earlier state of (a variant of) the system 100 of FIG. 1, a configuration in which one or more servers 500A of a private or semi-private network (e.g., coinciding with entity 210A) interact with one or more servers 500B of a public or semi-public network 610 (e.g., coinciding with entity 210B). A (blockchain or other) distributed ledger node 170 shows the oldest block 177A thereof in FIG. 1 together with several of the preceding blocks 677A-E of the node. Most or all of these contain various elements 685A of interest in a permanent, public, verified, distributed arrangement. Likewise, a private or other proprietary ledger node 180 shows the oldest block 188A thereof in FIG. 1 together with several of the preceding blocks 688A-C of the node. Most or all of these contain various elements 685B of interest in a permanent, secure arrangement that is at least partly accessible externally.

Such elements 685B may include one or more instances of smart contracts 625 or other code components 630 and in some variants may also include other content components 640 or shared resources 650 (or both) on-list as described herein. Such code components 630 may include one or more instances of routine or subroutine versions 631 (e.g., of device-executable code or source code thereof); of smart contract or other identifiers 632 (see FIG. 8); of trustworthiness-indicative or other scores 633 (e.g., pertaining to a code component 630 or an entity 210 that provides it); of Representation State Transfer protocol or other parameters 634; of time-stamped (provenance data describing) module invocations 635 associated with such parameters 634; or of other data objects relating to executable code (e.g., transactions or other elements 685C of a smart contract 625) immutably recorded on chain. Such content components 640 may include one or more instances of service version identifiers 641 (e.g., identifying a most up-to-date version 631 of a code component 630), termset version identifiers 642 (e.g., identifying license terms or conditions in effect for a particular user at or before an execution as described herein), or other such time-stamped data indelibly recorded in a ledger node 170, 180, 190. Such shared resources 650 may include built-in code (built-in subroutines called by some smart contracts 625) or a local instance 655 of a complete copy of a public ledger node 170, 190.

For example as described below, node 170 may reflect time-stamped transitions from a service version identifier 641 of 1.5 just before block 677D to a service version identifier 641 of 1.6 in block 677D and several minutes later to a service version identifier 641 of 1.7 in block 677A as shown. Such service version identifiers 641 may pertain to all executions of a given module type (e.g., see FIG. 8) by a particular entity therebetween, for example. This can occur, for example, in a context in which a service type provenance would otherwise not be recorded on-chain without having access to the executions of the corresponding code component 630.

Likewise as further described below, node 170 may reflect time-stamped transitions from a termset version identifier 642 of 4.2 just before block 677C to a termset version identifier 642 of 4.3 in block 677C and several minutes later to a termset version identifier 642 of 4.45 in block 677A as shown. Such transitions of termset version identifiers 642 may affect any and all executions of a given module type therebetween, for example, stating what priority will be applied or how utility tokens will be expended for the invocation of such execution. This can occur, for example, in a context in which public consensus could not otherwise be reached as to termset provenance (i.e., which license terms and conditions were in effect at the time of a particular execution of a code component).

Figure 7:
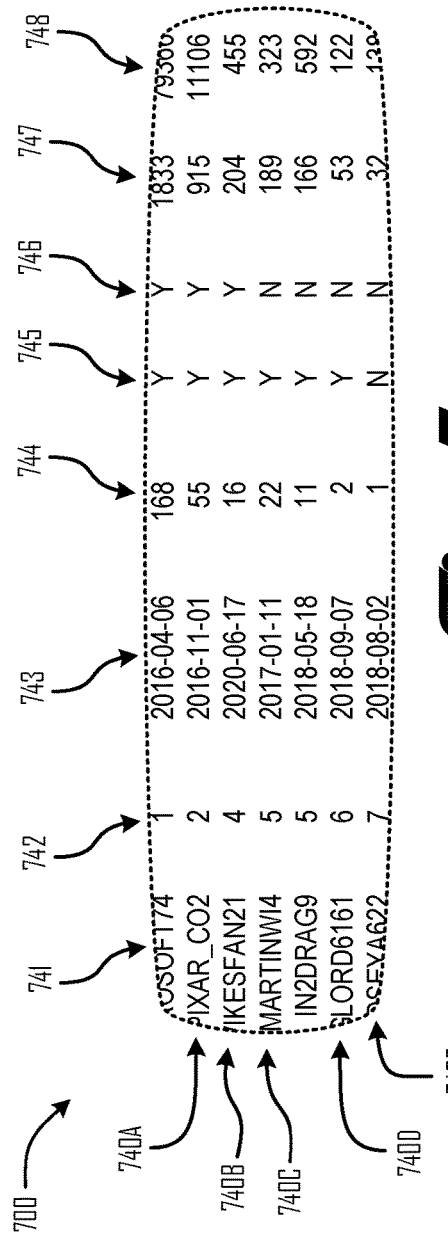
FIG. 7 depicts a media-resident record list in which one or more improved technologies may be incorporated.

FIG. 7 depicts a list 700 of records 740A-E each describing a (e.g., human) user or other content source 741 (e.g., a corporation or other entity 120). Each record 740 may include one or more instances of (privilege) tiers 741 (see FIG. 11); of dates 743 reflecting when that entity joined a cohort of users having privileges (e.g., according to the tiers 741) in some or all of network 620; of counts 744 (e.g., reflecting how many modules or versions have been uploaded by that entity); of (e.g., Boolean indications of) eligibility 745 for a lower privilege (e.g., posting a pictographic image or comment); of eligibility 746 for a higher privilege (e.g., posting a hyperlink or code component 630 so that it will be visible by other subscribers); of trustworthiness scores 747 (e.g., that increase over time at a variable rate absent suspicious behavior); of account balances 748 (e.g., of Dragon™ tokens or other utility tokens as described below); or of other tracked attributes (e.g., profile parameters) of an entity 120 having privileges on one or more servers 500A of network 620. In some variants such balances 748 may affect how fast a (positive scalar or other quantification of) trustworthiness of a content source 741 may increase, which may trigger (e.g., upon reaching a host-specified threshold as described herein) trigger a corresponding privilege (e.g., a power to upload content components 640).

Figure 8:
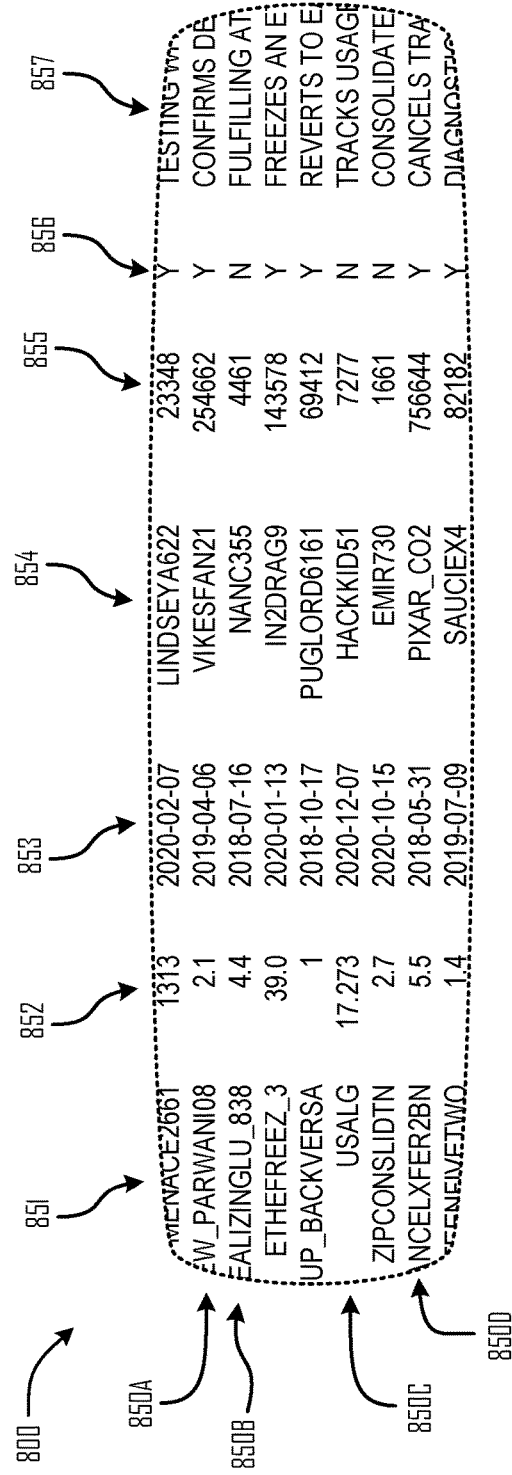
FIG. 8 depicts another media-resident record list in which one or more improved technologies may be incorporated.

FIG. 8 depicts a list 800 of records 850A-D each describing a smart contract or other device-executable code component 630 (e.g., in an inventory available to a particular user). Each record 850 may include one or more instances of alphanumeric or other module types 851; of alphanumeric or other version identifiers 852; of upload or release dates 853; of source identifiers 854 (e.g., corresponding to a content source 741 of list 700); of trustworthiness scores 855 (e.g., that increase over time at a variable rate absent suspicious behavior); of (Boolean indications of) suitability 856 for execution indicative of a high-enough trustworthiness (e.g., exceeding a threshold in effect for the particular user); of alphanumeric descriptors 857 describing each code component 630 (e.g., in a natural language) or version thereof; or of other tracked attributes (e.g., content components 640 in effect) of a code component 630 available for use on one or more servers 500A of network 620. In some variants such a current or recent balance 748 of a source 741 (e.g., with a source identifier 854 of "VIKESFAN21" in record 850A and record 740B) may affect how fast a (positive scalar or other quantification of) trustworthiness of a content component 640 is allowed to increase. This may trigger (e.g., upon reaching a host-specified threshold as described herein) a corresponding privilege (e.g., accessibility by or distribution to a larger cohort of users) for a given module or version 852.

Figure 9:
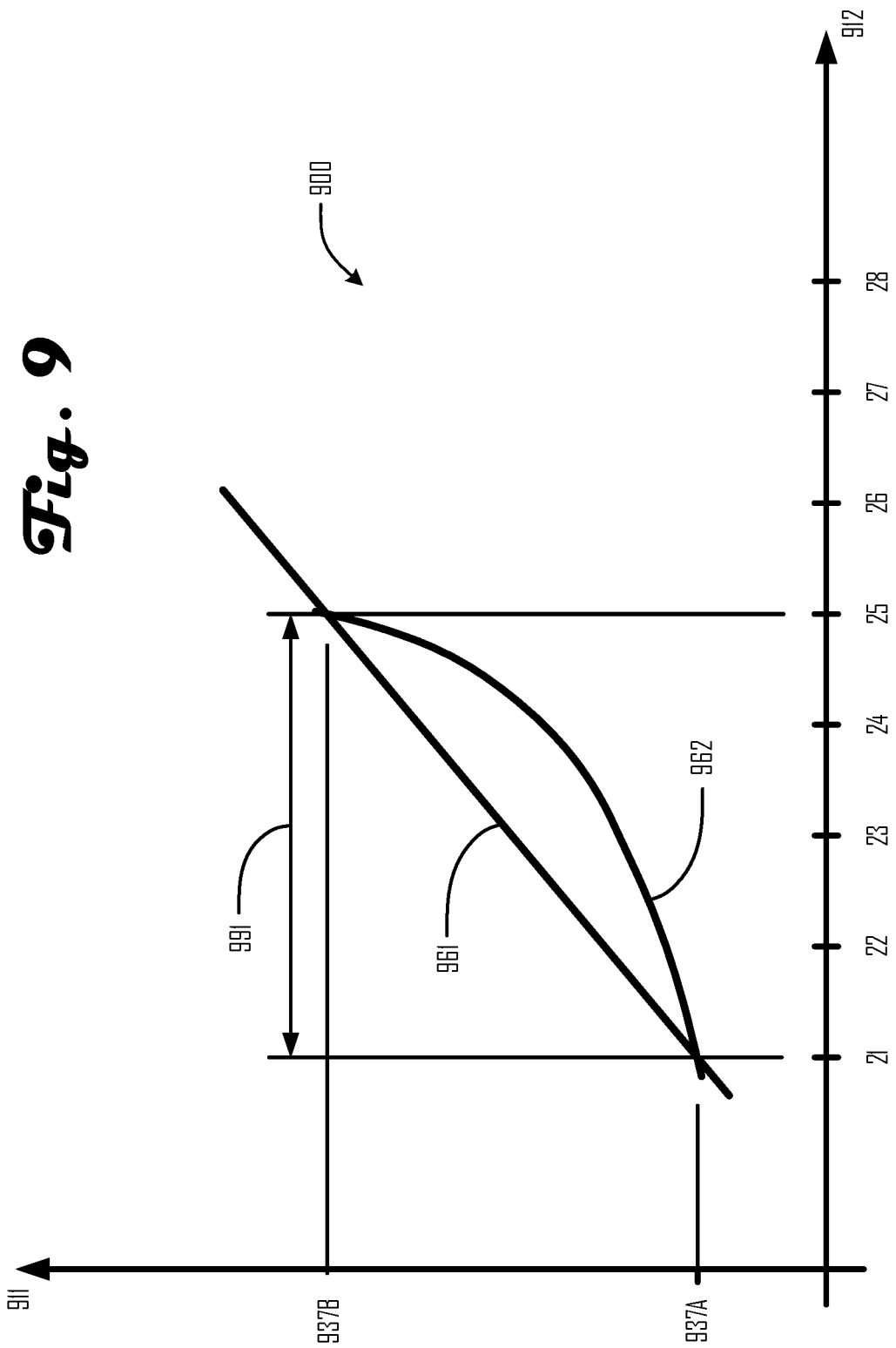
FIG. 9 is a plot showing how trustworthiness can increase over time in which one or more improved vetting technologies may be incorporated.

FIG. 9 exemplifies how (e.g., a scalar evaluation of) trustworthiness (e.g., of an entity or code component 630) can increase over time. A vertical axis 911 signifies a score 747, 855 (e.g., positively) indicative of trust plotted against a horizontal axis 912 signifying fixed units of time (e.g., days). A linear trajectory 961 shows trustworthiness increasing steadily from an initial value 937A to a threshold value 937B over a course of a few increments of time (e.g., from time 21 to time 25), wherein a privilege or other manifestation of status is bestowed (e.g., by one or more processors 502) upon reaching the threshold value 937B. In some variants an incremental increase or other manifestation of a slope of trajectory 961 may depend upon a current utility token balance 748 such that increasing the balance 748 incrementally decreases the interval 991 and decreasing the balance 748 incrementally increases the interval 991. In some variants an exponential, parabolic, hyperbolic, weighted polynomial, or other accelerating trajectory 962 may likewise quantify trustworthiness steadily increasing from initial value 937A to threshold value 937B over a course of the same interval 991. See FIGS. 11-12.

Figure 10:
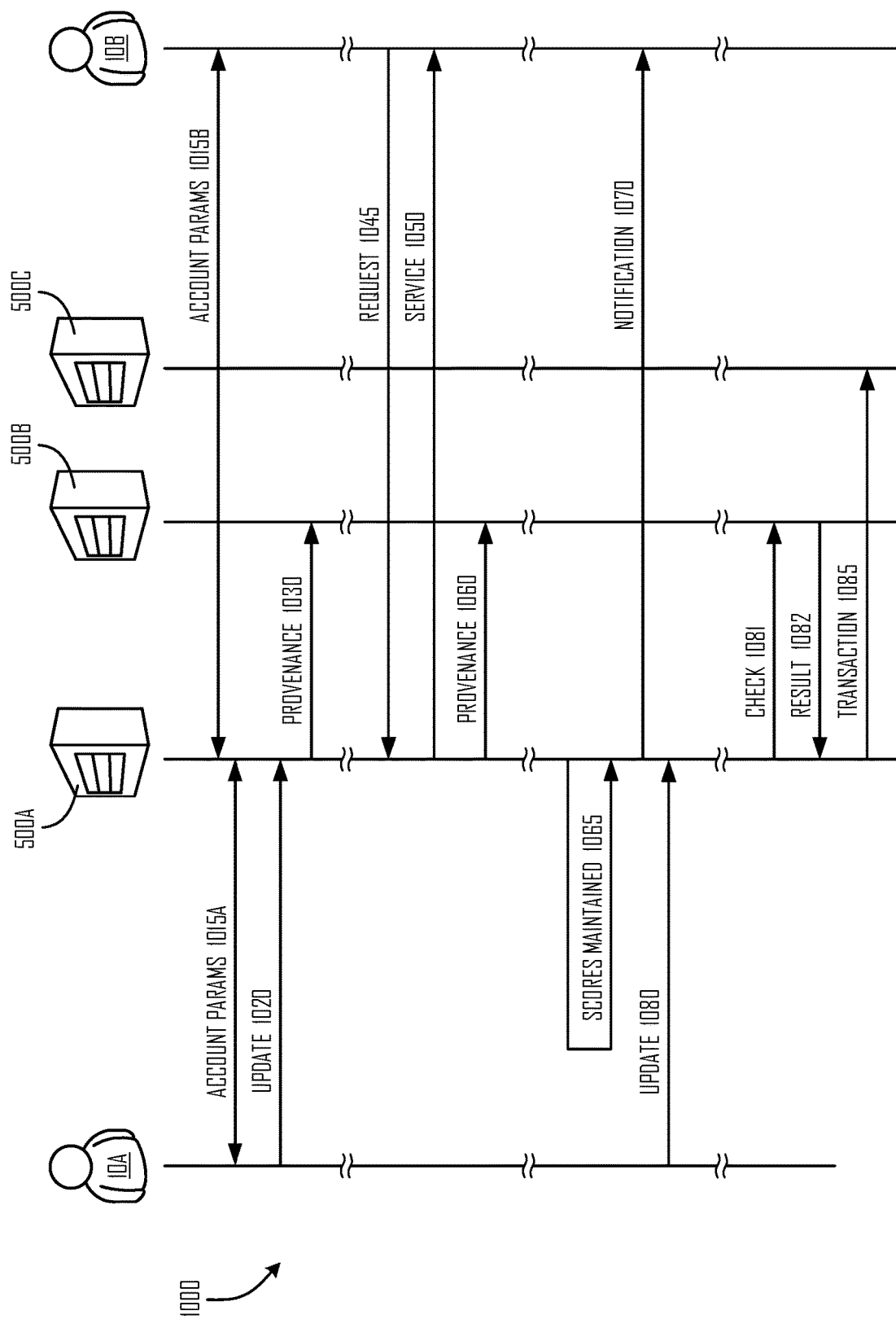
FIG. 10 depicts a particular scenario and progressive data flow in which client devices interact with one or more servers according to one or more improved technologies.

FIG. 10 depicts a particular scenario and progressive data flow 1000 in which client devices 300 (operated by users or other human entities 10A-B) interact with one or more servers 500A configured to control node 180, one or more servers 500B configured to facilitate access to node 170 (e.g., an Ethereum blockchain or other distributed ledger node featuring transaction-based state transitions and smart contract functionality), and one or more servers 500C configured to facilitate access to node 190 (e.g., a NEO blockchain or other distributed ledger node that supports code compiled into a secure executable environment). A coder or other human entity 10A configures a membership or similar account (e.g., on network 620) by establishing a profile and other account parameters 1015A. Likewise, an execution requester or other human entity 10B configures a membership or similar account by establishing a profile and other account parameters 1015B as described herein.

Thereafter entity 10A uploads a smart contract update 1020 containing a smart contract or other device-executable code component 630 that becomes a definitive version 852 of that module type 851 upon recordation onto (a then-newest block 188A of) node 180. A corresponding code component update provenance 1030 (e.g., manifested as a hash function of block 188A or otherwise of content including code component 630) of that update 1020 is recorded onto a public node 170 (e.g., by one or more servers 500B thereof).

Some time later, a request 1045 for an execution of (whatever is the current version of) that module type 851 is sent from entity 10B (e.g., the "requester"). If status-related requirements (e.g., pertaining to privileges as described below) permit a grant of that request, an execution of the code component 630 commences (e.g., as service 1050) and a corresponding notification (of the grant) is sent. And a corresponding code component execution provenance 1060 (e.g., including one or more dispensations of any utility tokens 382 authorized by the requester and required for such execution) of that update 1020 is recorded onto a public node 170 (e.g., by one or more servers 500B thereof). In some variants, for example, such execution may include ongoing periodic or other multiple iterative component executions (e.g., every few hours or days) that effectively monitor one or more nodes 170 for the appearance of one or more defined phenomena of interest (e.g., transactions to or from a requester-specified digital wallet 366 that exceed a requester-specified event frequency).

Meanwhile scores 633, 747, 855 are updated or otherwise maintained 1065 (e.g., periodically in light of a current utility token balance 748). When such scores cross a threshold corresponding to an eligibility or other meaningful transition, a corresponding notification 1070 is sent to one or more entities 10B. When a smart contract update or other update 1080 occurs in relation to a code component 630 identified by an entity, in some variants that will trigger another such corresponding notification 1070.

If a smart contract service 1050 provides for iterative execution of a particular code component 630 that monitors one or more public nodes 170, a check 1081 of that node 170 (or a local instance 655 thereof) is initiated and a result 1082 is received (e.g., "Found" or "Not Found"). In some instances, such results 1082 may be recorded to (e.g., a newest block of) or otherwise conditionally manifested as a transaction 1085 to another public blockchain (e.g., node 190). As used herein an "iterative" operation is one that occurs periodically (hourly or daily, e.g.) or otherwise repeatedly.

FIG. 11 depicts a semi-log plot 1100 with additional quantified examples of how trustworthiness (e.g., of an entity 10) can be deemed to increase over time. A vertical axis 1111 signifies (a logarithmic plot of) a score 747 indicative of trust plotted against a horizontal axis 1112 signifying fixed units of time (e.g., in years). As reflected in the tiers 742 pertaining to respective entities in FIG. 7, a tier 742 of "1" corresponds to range 1101 of scores 747 above 1600. Likewise, a tier 742 of "2" corresponds to range 1102 of scores 747 above 800. Likewise, a tier 742 of "3" corresponds to range 1103 of scores 747 above 400. Likewise, a tier 742 of "4" corresponds to range 1104 of scores 747 above 200. Likewise, a tier 742 of "5" corresponds to range 1105 of scores 747 above 100. Likewise, a tier 742 of "6" corresponds to range 1106 of scores 747 above 50. Intermediate trajectory 1161 reflects how an entity identified as (a username of) "PIXAR_CO2" might have risen from an initial score 747 below 50 (in 2016) linearly to a most recent score 747 above 800 in 2022. A much faster trajectory 1162 indicates a traversal of range 1105 that would have taken much less than a year. However, a transition 1167 marks decelerating transition (e.g., a divestiture of a substantial majority of utility tokens) experience by a user called "VIKESFAN" in late 2020, so that the traversal of range 1105 (across interval 1179) was actually much slower, taking more than a year to a most recent score of 204.

FIG. 12 like exemplifies how trustworthiness increases (e.g., from an initial value 1237A to a threshold value 1237B-C) can be made faster or slower, depicting a score 855 (e.g., of a smart contract or other code component 630) can be deemed to increase over time 1212 (e.g., in incremental units 41-49 of an hour or a day). In some variants a logarithmic, parabolic, hyperbolic, weighted polynomial, or other decelerating trajectory 1261 may likewise quantify trustworthiness steadily increasing from an initial value 1237A (e.g., signifying a transition 1267) to a threshold value 1237C over an intermediate interval 1291 of a few hours or days. On a slower trajectory 1262 (e.g., corresponding to a lower balance 748), a score 855 of the code component traverses the same increase in an interval 1292 that is more than 10% longer (slower) than the intermediate trajectory 1261. Likewise, on a faster-than-intermediate trajectory 1263 (e.g., corresponding to a higher balance 748), a score 855 of the code component 630 traverses the same increase in an interval 1293 that is more than 10% shorter (faster) than the intermediate trajectory 1261. Moreover, it can be seen from FIG. 9 that the same variations can be implemented for accelerating or linear trajectories 961-962 as well.

FIG. 13 depicts special-purpose transistor-based circuitry 1300—optionally implemented as an ASIC or in a UI governance server, for example—in which some or all of the functional modules described herein may be implemented. Transistor-based circuitry 1300 includes one or more instances of sequencing modules 1331, for example, each including an electrical node set 1341 upon which informational data is represented digitally as a corresponding voltage configuration 1351. Transistor-based circuitry 1300 likewise includes one or more instances of sequencing modules 1332 each including an electrical node set 1342 upon which informational data is represented digitally as a corresponding voltage configuration 1352. Transistor-based circuitry 1300 likewise includes one or more instances of responsive modules 1333 each including an electrical node set 1343 upon which informational data is represented digitally as a corresponding voltage configuration 1353. Transistor-based circuitry 1300 likewise includes one or more instances of responsive modules 1334 each including an electrical node set 1344 upon which informational data is represented digitally as a corresponding voltage configuration 1354. Transistor-based circuitry 1300 likewise includes one or more instances of responsive modules 1335 each including an electrical node set 1345 upon which informational data is represented digitally as a corresponding voltage configuration 1355. In some variants, as described below in the clauses and claims, such a module implements such functionality jointly (e.g., in conjunction with other modules or processors 302 described herein). Alternatively or additionally, in some variants such modules (or components thereof) may be distributed (e.g., so that some are implemented in special-purpose circuitry 522 of respective servers 500) as described above.

FIG. 1400 illustrates an operational flow 1400 suitable for use with at least one embodiment, such as may be performed (in some variants) on one or more servers 500 using special-purpose circuitry 522. As will be recognized by those having ordinary skill in the art, not all events of information management are illustrated in FIG. 14. Rather, for clarity, only those steps reasonably relevant to describing the distributed ledger interaction aspects of flow 1400 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1410 describes recording one or more (device-executable code components 630, service version identifiers 641, terms version identifiers 642, or other) elements of a first version of a first smart contract privately on a first private blockchain (e.g., one or more sequencing modules 1331 in one or more servers 500A triggering a recordation of one or more elements 685B of a first version 631 of a first smart contract privately on node 180). This can occur, for example, in a context in which node 180 implements the first private blockchain, in which a timestamp of a block containing the entire first smart contract or a code component 630 thereof is manifested as a voltage configuration 1351 on node set 1341, in which version control of the first smart contract is maintained on the one or more servers 500A (e.g., on node 180); in which the one or more servers 500A are configured to disable and report on any actual or apparent instance of unauthorized activity discovered (e.g., by flagging the version and recording the discovery on node 180); in which the one or more servers 500A may suggest to a requesting entity 10B that an older version 852 of the same module type 851 may be used in response to data corruption or other indicia of defects resulting from an execution of one or more code components 630; in which insufficient termset-indicative or service-version-indicative metadata (or both) would otherwise be difficult to obtain in relation to a particular execution; in which a vulnerability in network 610 was first found by an enterprising discoverer (e.g., entity 10A); and in which the discoverer would otherwise be incentivized to exploit the vulnerability rather than report it.

Operation 1420 describes retrieving blockchain data in a first public blockchain by executing the first smart contract using one or more parameters that identify both the first public blockchain and the blockchain data to be retrieved (e.g., one or more sequencing modules 1332 of the one or more servers 500A initiating an execution of the first version 631 of the first smart contract and thereby retrieving the blockchain data using one or more parameters 634 that explicitly or otherwise identify both node 170 and the elements 685A to be retrieved from it). This can occur, for example, in a context in which node 170 implements the first public blockchain; in which the node data comprises one or more elements 685A of block 677A; in which an address of a local instance 655 of node 170 is manifested as a voltage configuration 1352 on node set 1342; in which the local instance 655 is kept current enough that the blockchain data is validly retrieved from the public node 170 (e.g., by updates of once or more per hour) even if the first smart contract really only ever reads from the local instance 655; and in which sequencing module 1332 invokes most or all of the responsive modules 1333-1335 described herein. This can occur, for example, in a context in which one or more responsive modules 1333 is configured to compute one or more scores 633, 747, 855 described above and to implement conditional privileges accordingly; in which resulting eligibilities 744-745 and suitabilities 856 (e.g., according to tiers 742 and threshold values 937, 1237 described herein) are thereby determined and manifested as a voltage configuration 1353 on node set 1343; and in which the special-purpose circuitry 1300 would not otherwise achieve a workable balance between expediting legitimate activity and disempowering mischief (e.g., trolling and other malicious activity).

Operation 1430 describes configuring a second smart contract to include a first transaction that is partly based on the blockchain data from the first public blockchain and partly based on a public ledger destination (e.g., one or more sequencing modules 1334 of the one or more servers 500A creating or adapting the second smart contract 625 to include one or more elements 685 in a transaction partly based on first public ledger node data from node 170 and partly based on an address of the public ledger destination). This can occur, for example, in a context in which the first public ledger node data includes one or more elements 685A of block 177A (as shown in FIG. 1); in which the public ledger destination comprises (a newest block 199 of) node 190; and in which the second smart contract 625 is assembled on one or more servers 500A of network 620.

Operation 1440 describes implementing the first transaction of the second smart contract partly based on the blockchain data from the first public blockchain and partly based on the public ledger destination (e.g., one or more sequencing modules 1335 of the one or more servers 500A implementing at least some of the second smart contract 625 include one or more elements 685C as the first transaction). This can occur, for example, in a context in which the public ledger destination includes node 170 (e.g., at block 177D); in which the first public ledger node data includes one or more elements 685A of block 177A (as shown in FIG. 1); and in which an inalterable version-controlled module type 851 (e g, implementing the first smart contract or other built-in code component 630) could not otherwise be securely and selectively shared among users selectively (e.g., as a privilege described herein).

For example, an instance of block 677E was recorded when a service version identifier 641 of a first smart contract was 1.5 and when a termset version identifier 642 of the first smart contract was 4.2 in a particular scenario relating to FIGS. 6 and 14. When block 677D was later recorded, a service version identifier 641 of the same smart contract became 1.6 (e.g., signifying a different version of the software implementing that smart contract). If an undesired and unforeseen problem is discovered by entity 10B in an output from the newer service version 1.6, an administrator of the one or more servers 500A may trigger a reversion to a prior service version state (e.g., version 1.5) or implement a new version 1.7 copied or adapted from earlier blocks (e.g., before block 677E) that is effectively the same as version 1.5 was. Likewise, a termset version identifier 642 of the same smart contract became 4.3 upon block 677C being recorded. Such changes may signify a threshold 937, 1237 being adjusted, for example, or a utility token changing basis (e.g., from a unit of time to an instance of execution per token). If a complaint is received (e.g., reflecting an unexpected overcharge or misdirected token movement) in regard to terms or conditions of such service under version 4.3, an administrator of the one or more servers 500A may trigger a reversion to a prior termset version state (e.g., version 4.2) or implement a new version 4.45 copied or adapted from earlier blocks (e.g., before block 677E) that is effectively the same as version 4.2 was. Although the prior states of the service and termset versions are immutably recorded on node 180, they may remain private and readily available and, in some variants, may even be searchable within node 180.

FIG. 15 depicts event-sequencing logic 1500 that may be implemented or invoked (i.e., used for guiding a signal path or sequence of events) in one or more of the methods or systems 100, 200 described herein with regard to one or more individuals or other entities 1510. In some contexts, for example, a selected individual or other particular entity 1510A is designated to provide a security-related product or service (a validation or certification, e.g.) that another selected individual or other particular entity 1510B needs or has requested. One or more (instances of) decision protocols 1536 implement or monitor one or more outcomes 1545 each in the form of a record 1535 associating the entity/entities with each other or to a privilege (or both) as described below.

In a security-enhanced social media forum tailored for experienced users to share insights about Dragonchain platform tools or related aspects of blockchain, for example, a hierarchical privilege schema may be used in which only highly trusted entities 10, 210, 1510 are permitted to generate and own each original content thread 1530. This can occur, for example, in a context in which qualifying entities are automatically and conditionally determined using one or more highly selective original-content-thread-qualifying thresholds 1537A applied so that less-invested, less-committed forum participants cannot immediately serve this key function. One or more less-selective original-content-thread-qualifying thresholds 1537 may be imposed as a prerequisite for the unmoderated introduction of various types of replies 1532 in some variants. For example a privilege hierarchy may be imposed in which one or more graphic-image-qualifying thresholds 1537D may be imposed that are each less selective than a corresponding user-activatable-link-qualifying threshold 1537B or more selective than a corresponding thread-reply-qualifying threshold 1537C (or both).

Although many examples herein emphasize a correlation between privilege-related outcomes 1545 and (a tenure of) one or more inventories of cryptographic utility tokens (e.g., held for periods of weeks or months by many forum participants or other limited-access resource users), other determinants may also influence a trust-related score 633, 747, 855 of a candidate entity or option. For example, such determinants may include a success ratio, a "like" count or similar metric of crowdsourced validation, an offered product or service price or required price threshold, or other such qualifying parameter. To accelerate an initial understanding such parameters may in some instances be simply treated as noise 1529. In instances where a signal-to-noise ratio is high enough—manifested as a large-enough correlation coefficient in plots like that of FIG. 17, for example—a family of trustworthiness indications suited to numerous applications is presented as a meaningful security advance in the fields of cryptographic utility tokens and distributed ledgers.

Outcomes 1545 of particular interest in examples described below include one or more instances of invitations 1541 (e.g., to participate in a beta test or similar group initiative), of selections 1542 (e.g., of an entity 1510A who will provide a security related product or service or of an entity 1510B who will receive the product or service), or of notifications 1543 or lists 1544. Such conditional notifications 1543 to an entity 10, 210, 1510 may concern projects or interactions not yet available to members of the entity's current tier 742 but within a prescribed range (e.g., of 1 or 2 tiers). Alternatively or additionally, such outcomes 1545 may conditionally include identifications (in a list 1544) of other community members who are within such a prescribed range and who have expressed a willingness to be identified (for mentoring purposes, e.g.).

Figure 16:
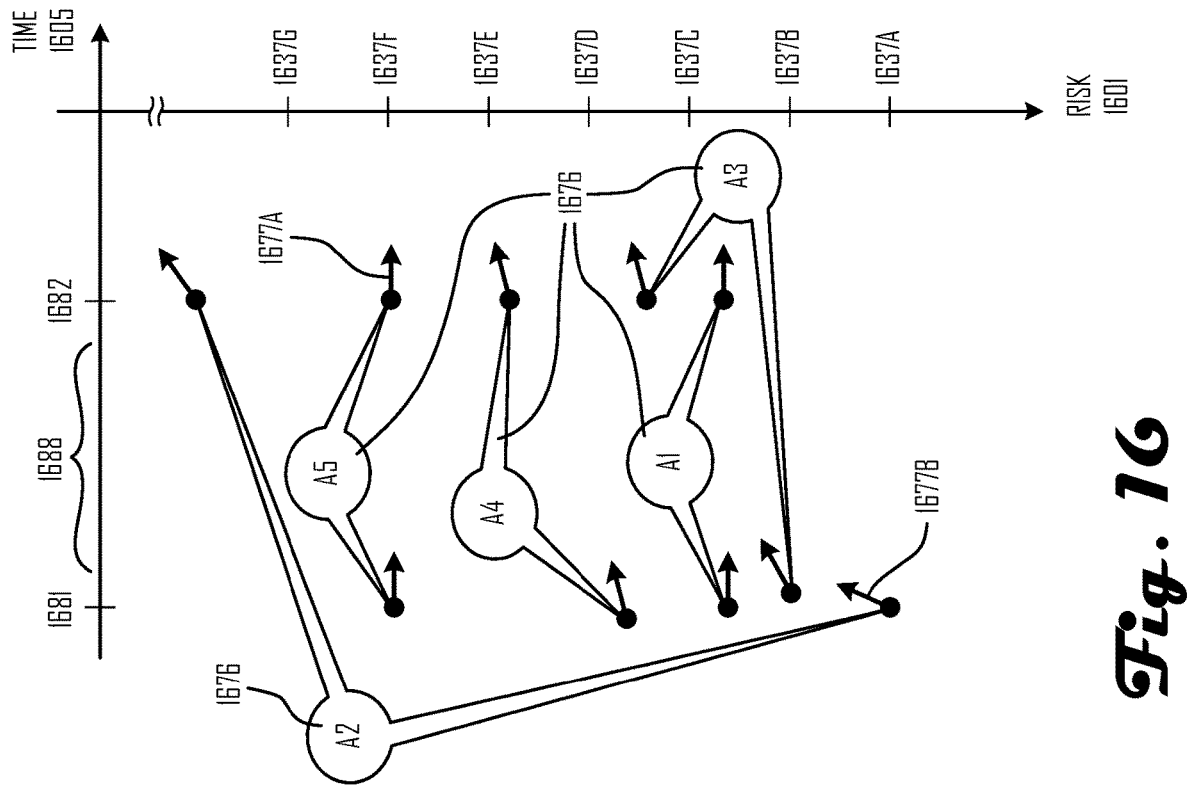
FIG. 16 depicts relative trustworthiness indications of several entities varying across an interval of time in which one or more improved technologies may be manifested.

FIG. 16 depicts relative trustworthiness indications 1676 of several entities 10 varying across an interval 1688 of time 1605 (e.g., of several days or several months). A vertical axis signifies risk 1601 that is contraindicative of (putative) trustworthiness. A range of risk-indicative levels 1637A-G span a low trust level 1637A upward to one or more higher trust levels 1637F-G. Several entities 10 each have a respective initial trust level (i.e., roughly at a time 1681) and respective trajectory 1677. A gradual trajectory 1677A signifies a trustworthiness indication 1676 that does not change much over a prescribed interval. A steep trajectory 1677B signifies a trustworthiness indication 1676 that changes much more over a prescribed interval. After a transition interval 1688 as shown each of the entities 10 are shown as manifesting a respective trust level at a particular time 1682 and a respective trajectory 1677. In some contexts, a trajectory 1677 may decrease in response to an inventory decrease or vice versa. Moreover, in some variants as further described below, a progression of trust levels 1637A-G as shown may each implement a respective manifested-trust-indicative qualifying threshold value 937, 1237.

Figure 17:
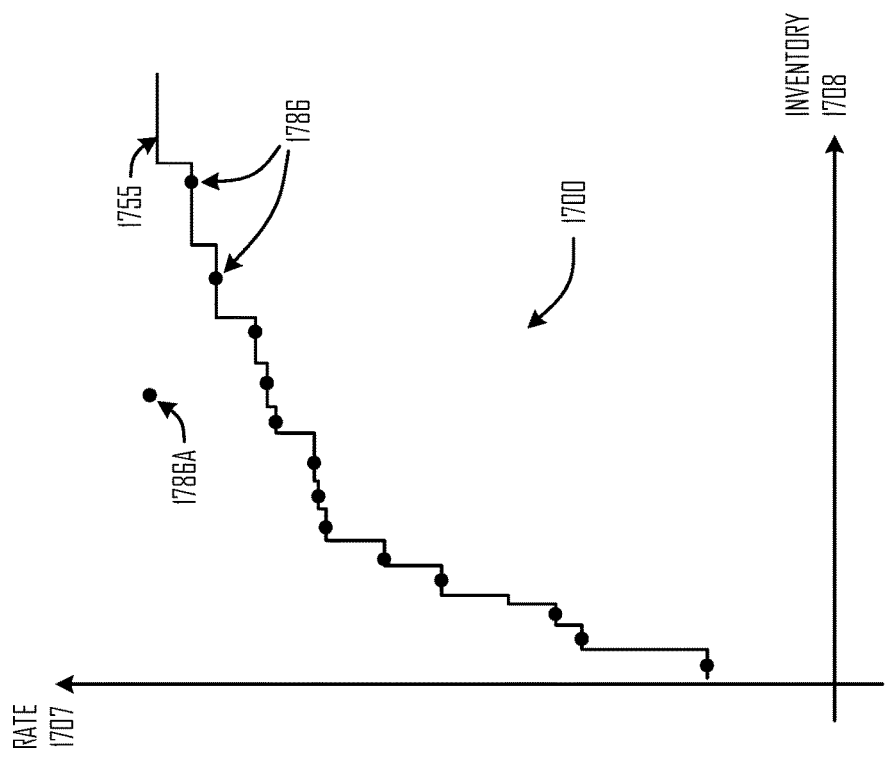
FIG. 17 depicts a transfer function generally indicating a positive correlation between an effective rate/steepness of several trajectories and a corresponding cryptographic utility token inventory each belonging to a respective entity.

FIG. 17 depicts a transfer function 1700 generally indicating a positive correlation between a rate 1707 of respective trajectories 1677 and a respective inventory 1708 of cryptographic utility tokens 382. Such transfer functions may include one or more components 1555 based on one or more exponential functions 1551, logarithmic functions 1552, or polynomial functions 1553 of a corresponding inventory 1708. Alternatively or additionally, such transfer functions may reflect a cooldown function 1554 or other occurrence granting, modifying, or limiting an eligibility of an entity (in a normalized apportionment as described with reference to FIG. 23, e.g.). Such effects may be sudden or temporary (or both) in some implementations.

In some variants transfer function 1700 may effectively implement a staircase or other monotonic function 1755 that accounts for more than half of the data points 1786 (each representing a respective entity at a particular moment of time, e.g.) visible on a linear-scale scatter plot as shown. When such data points are sufficient in number (more than 12, e.g.) and not all aligned vertically or horizontally, they may define a useful "best fit" line or other "best fit" polynomial function that models the transfer function 1700 if a substantial correlation exists therebetween. As used herein, a rate 1707 and inventory 1708 are "substantially correlating" if any outlying data points 1786A are close and infrequent enough to a monotonic staircase function 1755 that the rate 1707 and inventory 1708 have a (Pearson product-moment) correlation coefficient with a magnitude greater than 0.6.

FIG. 18 depicts an apportionment 1801 to an initially trusted "first" entity 10 that increases in trust by daily increments through several weeks 31-37 to describe a context in which such growth is so slow that the "first" entity becomes untrusted in this period of time 1805. The (arbitrary raw) units of apportionment in this instance are shown to increase from below 1000 to above 1500 raw increments.

As used herein an apportionment is "fairly uniform" among a cohort of two or more entities if none of the entities is "trusted" or "untrusted." This can occur, for example, in a context in which an apportionment of each of the entities in the cohort differs from a median apportionment M of the cohort by less than 10%. Entities who have an apportionment within 10% of M are described herein as "intermediately trusted." If an intermediately trusted entity becomes less trusted (through partial divestiture or dilution, e.g.), that entity may become "untrusted." If an intermediately untrusted entity becomes more trusted (through heavy investment or other noteworthy participation, e.g.), that entity may become "trusted."

FIG. 19 depicts an apportionment 1802 to an initially untrusted "second" entity 10 that increases in trust by daily increments over a similar period (including a transitional interval 1988 and a suspiciously large growth 1989 signaling a possible attack, as further described below) to describe how such growth is so fast that the "second" entity becomes trusted in this period. The units of apportionment in this instance are shown to increase from below 500 to above 10000 raw increments.

FIG. 20 depicts an apportionment 1803 to a steady intermediate "third" entity 10 (neither trusted nor untrusted initially) that increases in trust by moderate daily increments to exemplify how such an entity can be neither trusted nor untrusted both before and after the transitional interval 1988.

FIG. 21 depicts a time-varying normalized apportionment 2181 comprises an instantaneous apportionment 2181A at the outset of week 31 that is proportional to the corresponding first-shown raw apportionment 1801 associated with the "first" entity. Likewise, a time-varying normalized apportionment 2182 comprises an instantaneous apportionment 2182A at the outset of week 31 that is proportional to the corresponding first-shown raw apportionment 1802 associated with the "second" entity. Likewise, a time-varying normalized apportionment 2183 comprises an instantaneous apportionment 2183A at the outset of week 31 that is proportional to the corresponding first-shown raw apportionment 1803 associated with the "third" entity. Just as apportionment 1803 is initially larger than apportionment 1802 and smaller than apportionment 1801 at the outset of week 31, so is instantaneous apportionment 2183A larger than apportionment instantaneous apportionment 2182A and smaller than apportionment instantaneous apportionment 2181A to which they correspond.

Likewise, at the outset of week 33, the several normalized values 2181B, 2182B, 2183B respectively stand in proportion to their raw apportionment counterparts 1801-1803 at the outset of week 33. Likewise, partway through week 36, the several normalized values 2181C, 2182C, 2183C respectively stand in proportion to their raw apportionment counterparts 1801-1803 at the same time partway through week 36. Likewise, partway through week 37, the several normalized values 2181D, 2182D, 2183D respectively stand in proportion to their raw apportionment counterparts 1801-1803 at the same time partway through week 37. And just as the "second" entity's dramatic growth 1989 signals a significant shift in power (especially with trust lost by the first entity and gained by the second), a concern arises that such power concentrated in one entity may allow that entity to implement fraudulent transfers or validations if left unchecked. To guard against this possibility by keeping some power even within the control of an entity who has become untrusted, one or more attenuations are described below (with reference to FIGS. 24 and 26, e.g.). Such attenuations may, as described herein, maintain a balance between allowing cryptographic utility token inventories to serve their conventional functions and using inventory tenure to guard against nefarious software.

As used herein additional apportionments are "attenuated" if they signal diminishing returns for a later addition relative to that of an earlier addition (using a logarithmic or similar attenuation function, e.g.). See FIG. 24. As used herein a growth of a value is "large" if, during any one-week interval, the growth exceeds 100% (i.e., so that the value more than doubles). Likewise, a growth is "very large" if, during a one-week interval, the growth exceeds 900% (i.e., so that the value increases by more than an order of magnitude). Likewise, an apportionment dilution or other shrinkage of a value is "large" if, during a one-week interval, the shrinkage exceeds 50% (i.e., so that the value loses more than half its magnitude). As used herein a shrinkage of a value is "very large" if, during a one-week interval, the shrinkage exceeds 90%. As used herein an attenuation "prevents" an event if the event would have happened but—for the attenuation.

Figure 22:
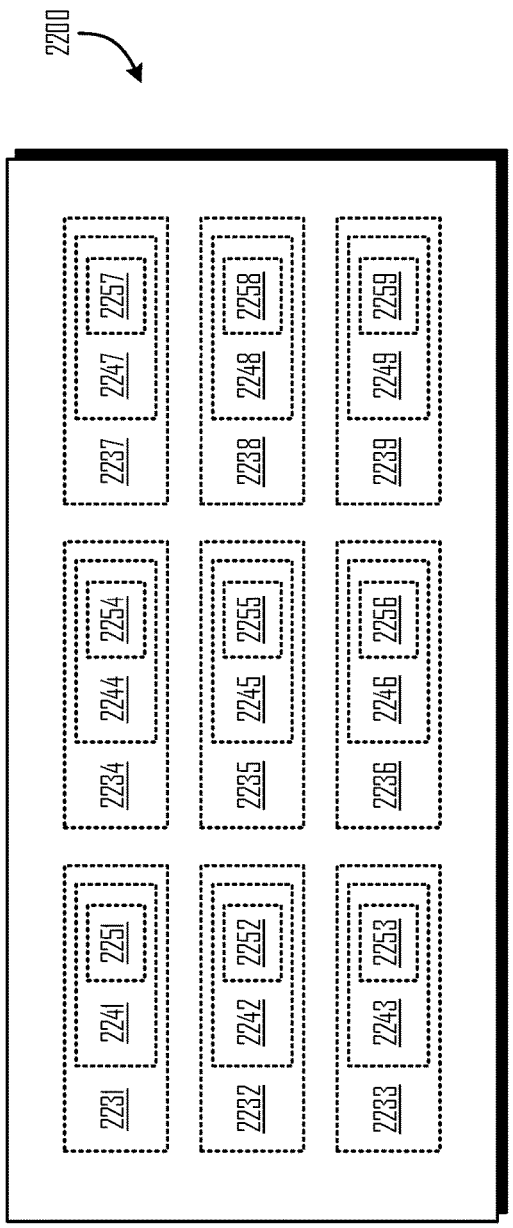
FIG. 22 depicts additional special-purpose transistor-based circuitry in which one or more improved technologies may be incorporated.

Referring now to FIG. 22, there is shown a special-purpose transistor-based circuitry 2200—optionally implemented as an ASIC or in a UI governance server, for example—in which some or all of the functional modules described herein may be implemented. Transistor-based circuitry 2200 includes one or more instances of association modules 2231, for example, each including an electrical node set 2241 upon which informational data is represented digitally as a corresponding voltage configuration 2251. Transistor-based circuitry 2200 likewise includes one or more instances of auditing modules 2232 each including an electrical node set 2242 upon which informational data is represented digitally as a corresponding voltage configuration 2252. Transistor-based circuitry 2200 likewise includes one or more instances of update modules 2233 each including an electrical node set 2243 upon which informational data is represented digitally as a corresponding voltage configuration 2253. Transistor-based circuitry 2200 likewise includes one or more instances of thread origination modules 2234 each including an electrical node set 2244 upon which informational data is represented digitally as a corresponding voltage configuration 2254. Transistor-based circuitry 2200 likewise includes one or more instances of sequencing modules 2235 each including an electrical node set 2245 upon which informational data is represented digitally as a corresponding voltage configuration 2255. Transistor-based circuitry 2200 likewise includes one or more instances of invocation modules 2236 each including an electrical node set 2246 upon which informational data is represented digitally as a corresponding voltage configuration 2256. Transistor-based circuitry 2200 likewise includes one or more instances of link posting modules 2237 each including an electrical node set 2247 upon which informational data is represented digitally as a corresponding voltage configuration 2257. Transistor-based circuitry 2200 likewise includes one or more instances of image posting modules 2238 each including an electrical node set 2248 upon which informational data is represented digitally as a corresponding voltage configuration 2258. Transistor-based circuitry 2200 likewise includes one or more instances of thread reply modules 2239 each including an electrical node set 2249 upon which informational data is represented digitally as a corresponding voltage configuration 2259. In some variants, as described below in the clauses and claims, such a module implements such functionality jointly (e.g., in conjunction with one or more invocation modules 2236 or processors 302 described herein). Alternatively or additionally, in some variants such modules (or components thereof) may be distributed (e.g., so that some are implemented in special-purpose circuitry 522 of respective servers 500) as described above.

Figure 23:
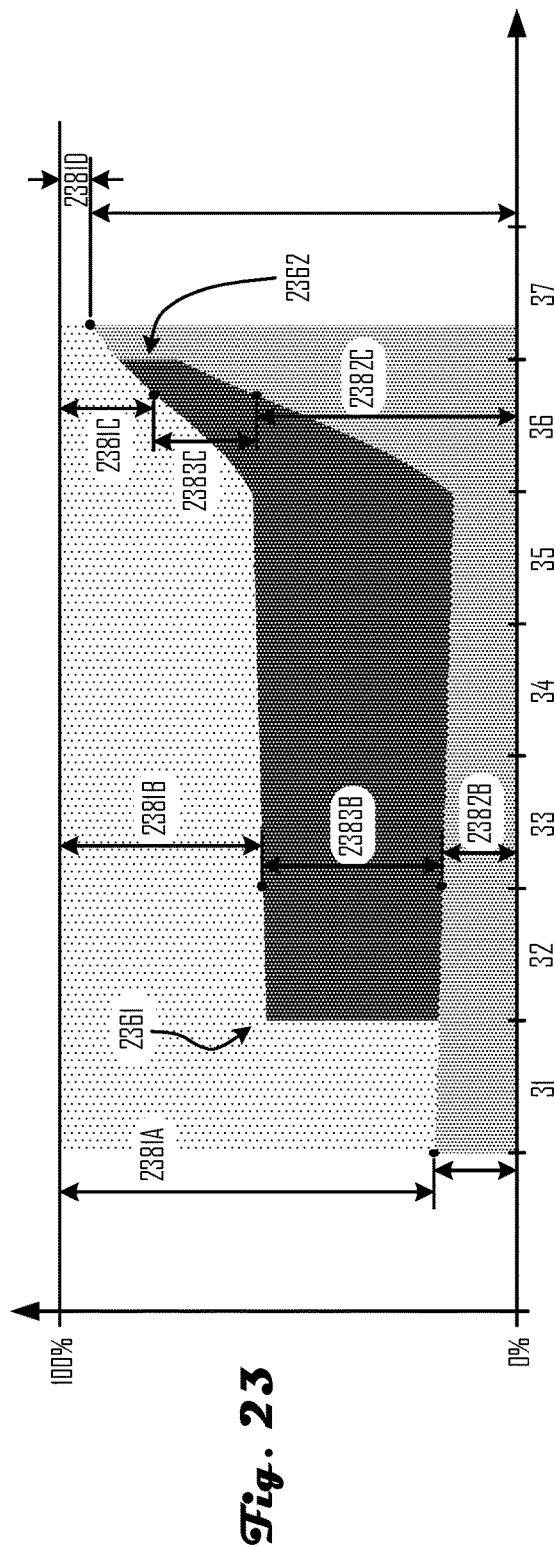
FIG. 23 depicts time-varying normalized apportionments like those of FIG. 21 but reflecting dedications of apportionments transferred among the eligible entities.

FIG. 23 depicts time-varying normalized apportionments like those of FIG. 21 but reflecting dedications 2361, 2362 of apportionments transferred among entities who are eligible at least before or after such dedications. A time-varying normalized apportionment 2381 comprises an instantaneous apportionment 2381A at the outset of week 31 that is proportional to a sum of the corresponding first-shown raw apportionment 1801, 1802 associated with the "first" and "third" entities, signifying an alternative event sequence in which the "third" entity 10 does not become eligible until the end of week 31. At that point, a partial dedication 2361 authorized by the "first" entity allows a large minority of the "first" entity's apportionment 2381 to be dedicated to the "third" entity and thereby allows the "third" apportionment 2383 to come into being.

At the outset of week 33 in this alternative event sequence, the several normalized values 2381B, 2382B, 2383B respectively stand in proportion to their raw apportionment counterparts 1801-1803 at the outset of week 33 as shown in FIGS. 18-21. Likewise, partway through week 36, the several normalized values 2381C, 2382C, 2383C respectively stand in proportion to their raw apportionment counterparts 1801-1803 at the same time partway through week 36 just as shown in FIGS. 18-21. In the alternative event sequence of FIG. 23, however, a complete dedication 2362 allows an entirety of the "third" entity's apportionment 2383 to be dedicated to the "second" entity, rendering the "third" entity again ineligible. This dedication 2362 will create a higher likelihood that the "second" entity would prevail in a probabilistic selection 1542 that occurs thereafter, but systemic integrity is nonetheless maintained by virtue of the attenuation described below, insofar that a significant apportionment 2381D will remain with the now-untrusted "first" entity (equal to apportionment 2181D) during any such selection. Moreover, it is hoped that a risk of a probabilistic selection 1542 in favor of the now-untrusted "first" entity, even if diminished to one part-per-million or lower, would effectively deter even an affluent and nefarious artificial intelligence coordinating the activities of the "second" entity.

As used herein a "probabilistic selection" is an unforeseeable (i.e., random or pseudorandom) selection in which a likelihood of each eligible entity Ei being selected/matched depends upon a size of a corresponding one of the apportionments $A_{1-N}$ in relation to one or more other entities Ej who are also eligible and a size of one or more apportionments $A_{1-N}$ to which they each correspond, wherein N>1.

Figure 24:
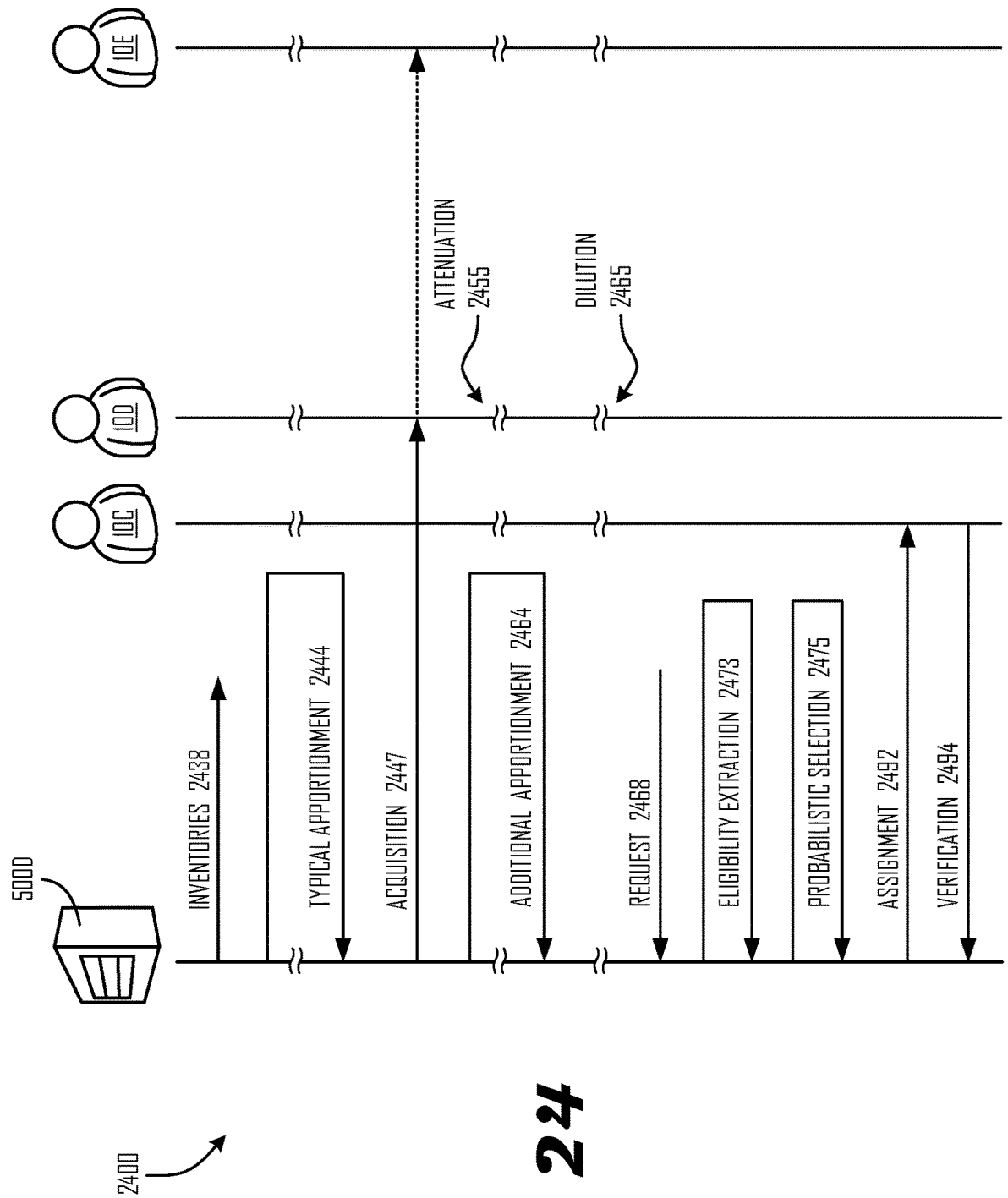
FIG. 24 depicts a particular scenario and progressive data flow in which client devices may each interact with one or more servers generally as described above with reference to FIG. 10.

FIG. 24 depicts a particular scenario and progressive data flow 2400 in which client devices 300 may interact with one or more servers 500D generally as described above with reference to FIG. 10. Various human entities 10 A-E each establish a membership or similar account (e.g., on network 620) by creating a profile and providing various account parameters 1015. Thereafter they acquire respective inventories 2438 of cryptographic utility tokens and receive a typical apportionment 2444 (across a transition interval 1588, 1988 as described above, for example). Thereafter they may initiate one or more acquisitions 2447 of additional inventories of cryptographic utility tokens and accordingly receive additional apportionments 2464 (across a transition interval 1588, 1988 as described above, for example). As used herein an apportionment is "additional" if it signals an increase in trust, whether or not a negative or other inverse trust index (quantifying risk 1601, e.g.) is used. To the extent that such additional inventories seem to signal an attack, however, an attenuation 2455 mitigates such additional apportionments 2464 as a deceleration (observable as a shrinkage in the upward trend at higher inventories as shown in FIG. 17) and a somewhat smaller dilution 2465 affecting one or more entities 10C who did not participate in such acquisition than would have occurred without the attenuation 2465. Even if the additional apportionment 2464 causes an enormous aggregation of most or all of the available cryptographic utility token supply, a possibility thus remains that a marginalized entity 10C may be selected to provide a verification, the risk of which may effectively deter attacks upon networks 620 in which the safeguards described herein are in effect.

Figure 25:
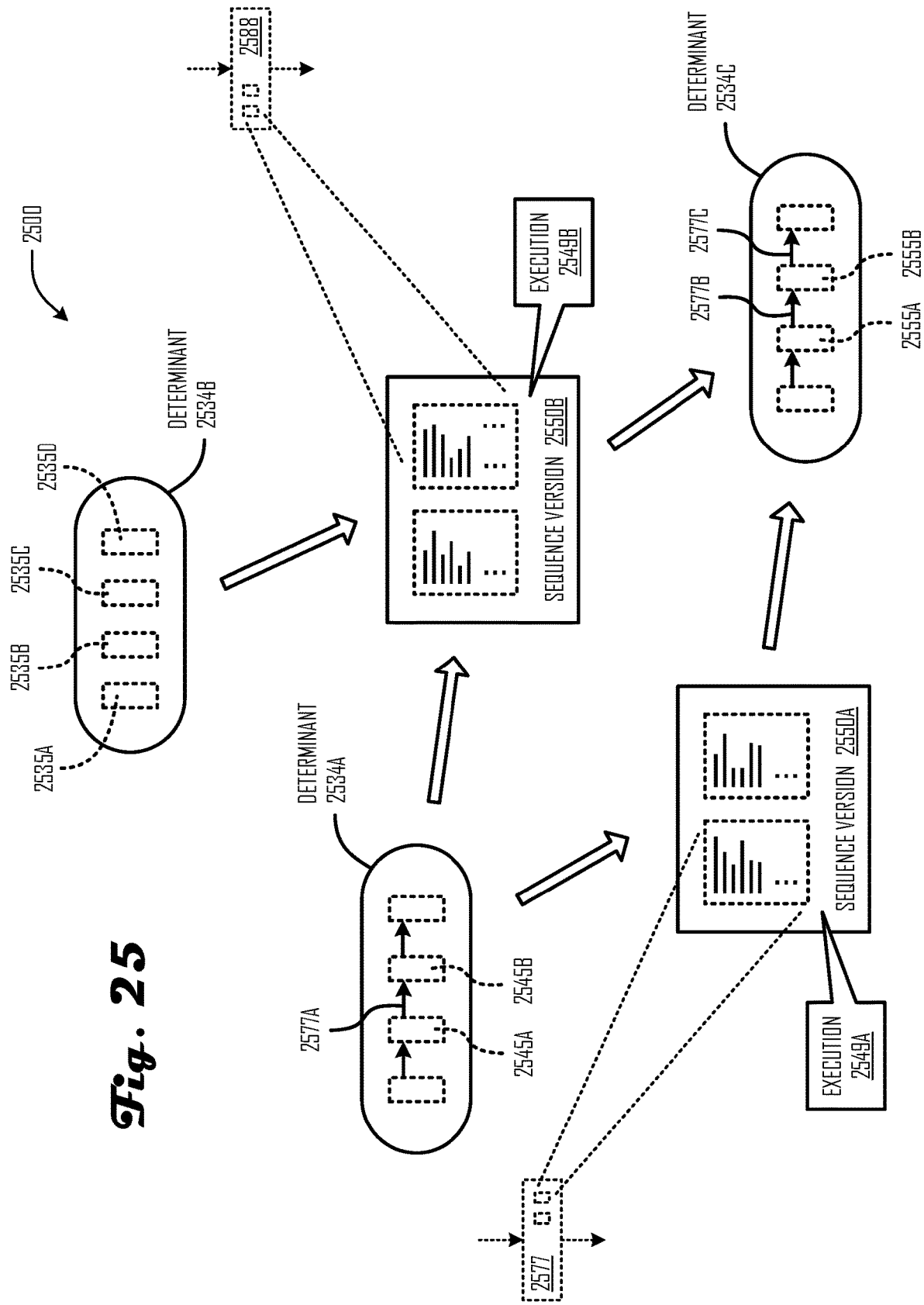
FIG. 25 depicts a state transition data flow in which one or more improved technologies may be incorporated.
Figure 27:
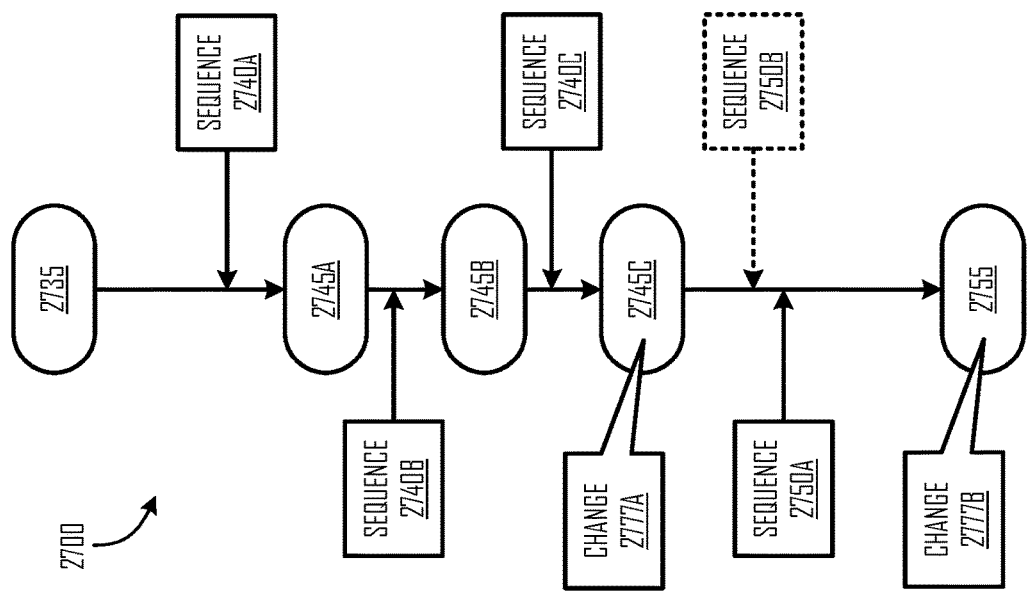
FIG. 27 depicts another state transition data flow in which one or more improved technologies may be incorporated for cascading data flow.

FIG. 25 illustrates a state transition data flow 2500 suitable for use with at least one embodiment in which at least some state transitions affecting one or more upstream data elements (user selections or other input determinants 2534A-B, e.g.) automatically trigger an execution of one or more code sequence versions 2550 so as to modify one or more downstream data elements (block write events or other outcomes 1545 comprising output determinants 2534C, e.g.). For example, such modifications may allow a non-automated code sequence version 2550A, in response to a manual invocation (i.e., initiated by a human user/entity), to modify one or more other values 2555 downstream. Moreover in some variants (e.g., as described below with reference to FIG. 27) such value changes 2577 may trigger an additional (cascading) execution 2549 of one or more other code sequences (see FIG. 27) so as to generate further changes 2577C of output values 2555 as shown. In some variants described with reference to FIG. 28, for example, a state transition data flow 2500 may be upgraded to facilitate one or more subsequent executions 2549 of a replacement or alternative code sequence that is triggered as an automatic response to at least one such value change.

This can occur, for example, in a context in which a given value 2545A undergoing a change 2577A to a later value 2545B corresponds to a respective resulting output value 2555A undergoing a change 2577B to a later value 2555B and in which a code sequence version 2550B is installed, either concurrently with or in a replacement of, an earlier-installed code sequence version 2550A. In some contexts, moreover, a later-installed (third or other) version 2550 (not shown in FIG. 25) of the primary code sequence may re-enable a code sequence version 2550A that was disabled by the installation of a "second" code sequence version 2550B. This can occur, for example, in a context in which a last-written sequence version 2550 causes one or more executions 2549B of the second version 2550B to occur in some circumstances (e.g., based on one or more input or intermediate determinants 2534A-B) and one or more executions 2549A of the first version 2550A to occur in other circumstances so as to implement a (user-configurable or other) particular level of incremental load-sharing between that last-written sequence version 2550 and one or more earlier-written code sequence versions 2550.

As used herein an element value 2535 or other determinant 2534 results "directly" from a device-implemented code sequence execution 2549 if one or more devices 300 executing the code sequence retrieve or otherwise trigger a transmission of such determinants as a proximate result of the execution 2549. Each such execution 2549 may, for example, compile, evaluate, aggregate, sample, distill, test summarize, or otherwise use one or more input determinants 2534A-B (or a transition thereof) to generate a distillation or other output digital determinants 2534C as described herein. In some variants, for example, some or all of a given sequence version 2550A (or a hash function thereof) may be retrieved or validated from one or more blocks 2577 of a public blockchain (at node 170, e.g.) as a direct result of an execution 2549A. Alternatively or additionally, some or all of another sequence version 2550B (or a hash function thereof) may be retrieved from one or more blocks 2588 of a non-public blockchain (at node 180, e.g.) as a direct result of an execution 2549B.

In some scenarios an initial code sequence version 2550A that has previously been executed is thereafter partially or totally replaced by a newer code sequence version 2550B. This can occur, for example, in a context in which the newer version 2550B shares a processing load previously served by the initial code sequence version 2550A or when the newer version 2550B temporarily or otherwise replaces the initial code sequence version 2550A. As used herein a prior code sequence version 2550 is "replaced" if a substitute code sequence version 2550 is provided and configured such that at least some module invocations 635 that would have triggered an execution of the prior code sequence version 2550 will now trigger an execution one or more replacement code sequence versions 2550 instead. A code sequence replacement may be partial or total and may be temporary or permanent. As used herein a code sequence is "disabled" if it has previously been ready to be executed (such as with an invocation that does not require preparatory code reconfiguration) but is thereafter made impossible to execute (such as by being blocked or otherwise reconfigured) unless and until it is re-enabled (such as by being moved or otherwise reconfigured). In some variants, for example, such determinants 2534 may include one or more (instances of) operating parameter values 2535A (version identifiers 641-642 or thresholds 1537, e.g.); of code sequences or hash values 2535B thereof; of private keys 381 or other shared resources 650 identified by their values 2535C; of source code or other alphanumeric values 2535D that can be presented to and understood by human users; or of combinations of these.

Figure 26:
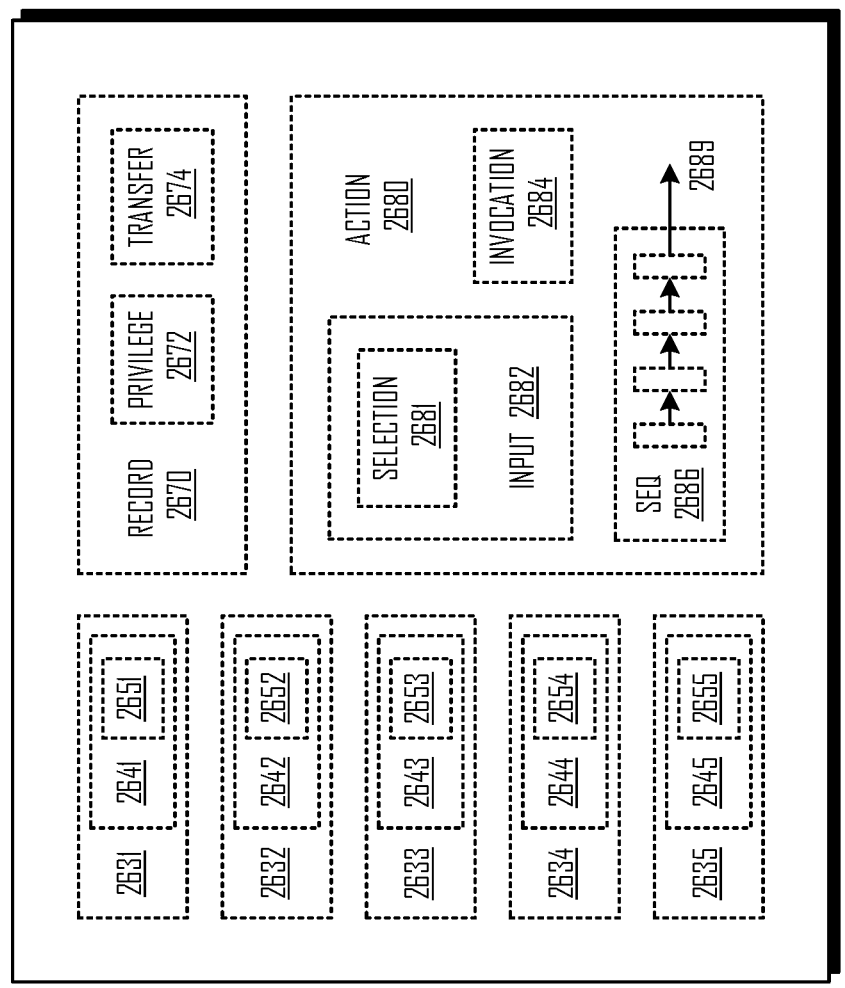
FIG. 26 depicts special-purpose transistor-based circuitry in which one or more improved technologies may be incorporated.

Referring now to FIG. 26, there is shown a special-purpose transistor-based circuitry 2600—optionally implemented as an ASIC or in a UI governance server, for example—in which some or all of the functional modules described herein may be implemented. Transistor-based circuitry 2600 includes one or more instances of detection modules 2631, for example, each including an electrical node set 2641 upon which informational data is represented digitally as a corresponding voltage configuration 2651. Transistor-based circuitry 2600 likewise includes one or more instances of authorization modules 2632 each including an electrical node set 2642 upon which informational data is represented digitally as a corresponding voltage configuration 2652. Transistor-based circuitry 2600 likewise includes one or more instances of processing modules 2633 each including an electrical node set 2643 upon which informational data is represented digitally as a corresponding voltage configuration 2653. Transistor-based circuitry 2600 likewise includes one or more instances of automation modules 2634 each including an electrical node set 2644 upon which informational data is represented digitally as a corresponding voltage configuration 2654. Transistor-based circuitry 2600 likewise includes one or more instances of response modules 2635 each including an electrical node set 2645 upon which informational data is represented digitally as a corresponding voltage configuration 2655. In some variants, as described below in the clauses and claims, such a module implements such functionality jointly (e.g., in conjunction with one or more invocation modules 2236 or processors 302 described herein). Alternatively or additionally, in some variants such modules (or components thereof) may be distributed (e.g., so that some are implemented in special-purpose circuitry 522 of respective servers 500) as described above. In some variants transistor-based circuitry 2600 may further include one or more instances of privileges 2672, transfers 2674, or other components of records 2670 described below; one or more instances of inputs 2682 or other actions 2680 manifesting an invocation 2684; or one or more instances of selections 2681 of operation sequences 2686 that generate one or more outputs 2689 as further described below. Triggering an execution of code sequence versions 2550A-B may, for example, may cause one or more selections 2681 or other inputs 2682 to be processed into a hash function or other evaluation that is then created and transmitted as a process output 2689. Numerous implementations in which computer software instructions or other operational sequences 2686 may be useful will be evident to one skilled in the art in light of teachings herein.

FIG. 2700 illustrates a cascading state transition data flow 2700 suitable for use with at least one embodiment in which at least some state transitions affecting one or more input data elements 2735 automatically trigger an execution of one or more code sequences 2740A so as to modify one or more preparatory intermediate data elements 2745A. Such modifications allow a non-automated code sequence 2740B, in response to a keyed user input 2682 or other invocation 2684 by a human user/entity 10, in turn to modify one or more other intermediate data elements 2745B downstream so as to trigger an execution 2549 of one or more other code sequences 2740C so as to generate a corresponding automatic change 2777A to one or more other intermediate data elements 2745C. Such changes previously allowed a non-automated code sequence 2750A, in response to another instance of a manual human invocation 2684, in turn to trigger a change 2777B to one or more output data elements 2755. In a flow of FIG. 28 and related variants described herein, however, cascading state transition data flow 2700 may be upgraded to facilitate one or more subsequent executions 2549 of a replacement or other similar code sequence 2750B that is triggered as an automatic response to at least one change 2777A to one or more data elements 2745C upstream. In the interest of convenience and to highlight this upgrade, the subject sequences 2750A-B are sometimes called "primary" and the those upstream are sometimes called "secondary." Such tags are used herein are used to distinguish respective referents for ease of reading, however, not necessarily as cardinal designations signifying special importance. As used herein a data element is "intermediate" if it manifests a result of computation (as contrasted with raw input 2682 merely digitizing or storing manual selections 2681, sensor input 2682, or responsive actions 2680 of a human user/entity 10, e.g.). As used herein an execution of a code sequence 2750 is triggered "manually" if a user's menu selection 2681, keyed-in command, or other human action 2680 was a proximate cause of the execution 2549 and if the execution 2549 commenced less than 2 seconds after the action 2680.

Figure 28:
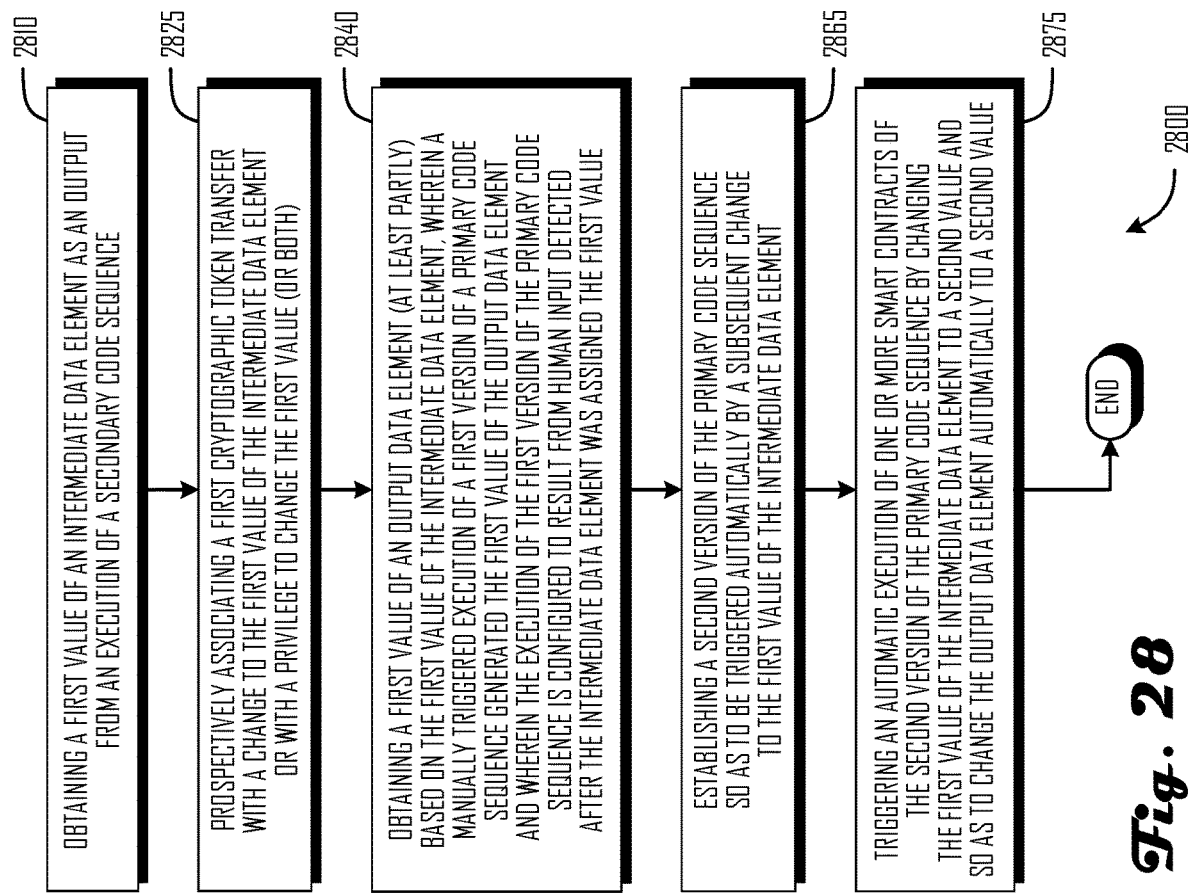
FIG. 28 depicts an operational flow in which one or more improved technologies may be incorporated for incremental automation.

FIG. 2800 illustrates an operational flow 2800 suitable for use with at least one embodiment, such as may be performed (in some variants) on one or more servers 500 using special-purpose circuitry 522 or in a serverless fashion (or both). As will be recognized by those having ordinary skill in the art, not all events of information management are illustrated in FIG. 28. Rather, for clarity, only those steps reasonably relevant to describing the distributed ledger interaction aspects of flow 2800 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 2810 describes obtaining a first value of an intermediate data element as an output from an execution of a secondary code sequence (e.g., one or more detection modules 2631 of transistor-based circuitry 2600 receiving a first value 2545A of an intermediate data element 2745 as an output 2689 from a first version 2540 of a remotely executed preparatory code sequence 2740 based on a first value 2535A of a remote-user-provided input data element 2735). This can occur, for example, in a context in which the code sequence 2740C is executed abroad or in a decentralized fashion (e.g., in one or more smart contracts of a public blockchain or another distributed ledger implementation) and in which the intermediate data element 2745C is manifested as a voltage configuration 2651 on a node set 2641 of such a detection module 2631. Alternatively or additionally, the intermediate data element 2745C may result from a hybrid (i.e., partially-automated) preparatory sequence combining one or more manual sequences 2740B with one or more automated sequences 2740C.

Operation 2825 describes prospectively associating a first cryptographic token transfer with a change to the first value of the intermediate data element or with a privilege to change the first value (e.g., one or more authorization modules 2632 creating or otherwise establishing a record 2670 associating a first cryptographic token transfer 2674 with a privilege 2672 to change the first value 2545A of the intermediate data element 2745C or with a specific change 2777A to the first value 2545A of the intermediate data element 2745C). This can occur, for example, in a context in which an entity 10 has elected one of various available cryptographic token transfers 2674 to accept or transmit in association with the specific change 2777A or with a class of changes 2777 that includes the specific change 2777A; in which the intermediate data element is a user-identified variable (identified as a module input or output, e.g.); in which the change 2777A is manifested as a voltage configuration 2652 on a node set 2642 of such an authorization module 2632; and in which the election manifests a user's decision of how one or more sequence versions 2550A-B will be automated. This can occur, for example, in a context in which two or more sequence versions 2550 will remain concurrently available and in which a de facto hierarchy among the two or more sequence versions 2550 is thereby established partly based on such election(s) and partly based on one or more ongoing cryptographic token balances 748 or apportionments 1801-1803. Alternatively or additionally, such elections may implement probabilistic selections 1542 or other outcomes 1545 as described herein with reference to FIG. 15 (to implement a matchmaking function or other security protocols, e.g.).

As used herein one or more state changes are "prospectively" associated with a token transfer 2674 (at least) if an amount of the token transfer 2674 is (at least conditionally) determined long before the one or more state changes take effect. An amount of a given type of utility token, for example, may be associated with a user's privilege 2672 to update a data element 2735, 2745, 2755 (e.g., with a periodic subscription) or with each instance of the data element being updated. If a record 2670 defines a transfer 2674 long before (i.e., by more than one hour) one or more state changes 2777 thereby authorized, the record 2670 manifests a prospective association. As used herein a value is a "user-identified variable" if it corresponds to a descriptive alphanumeric variable set forth in source code or otherwise intentionally assigned (as contrasted with being a mere unintended by-product of a compilation or other automated process).

Operation 2840 describes obtaining a first value of an output data element based on the first value of the intermediate data element (e.g., one or more processing modules 2633 of transistor-based circuitry 2600 obtaining a first value 2555A of a first output data element 2755 at least partly based on the first value 2545A of the intermediate data element 2745C). This can occur, for example, in a context in which a first execution 2549A of a first version 2550A of a primary code sequence 2750A generated the first value 2555A of the first output data element 2755 based on the first value 2545A of the intermediate data element 2745C (as a first input parameter thereof, e.g.), in which the first execution 2549A of the first version 2550A of the primary code sequence 2750A was configured to result from human input 2682 generated (by one or more users 10, e.g.) after the intermediate data element 2745C was changed (i.e., from a different prior value 2545) to the first value 2545A, and in which in which an address of a local instance 655 of the primary code sequence 2750A is manifested as a voltage configuration 2653 on a node set 2643 of such a processing module 2633. Alternatively or additionally, such a voltage configuration 2653 may manifest a code sequence identifier 632 or hash function of the version 2550A used to generate the first output data element 2755.

Operation 2865 describes configuring a second version of the primary code sequence so as to be triggered automatically by a subsequent change to the first value of the intermediate data element (e.g., one or more automation modules 2634 of transistor-based circuitry 2600 establishing a second version 2550B of the primary code sequence 2750B so as to be triggered automatically by a subsequent change 2777A to the first value 2545A of the intermediate/secondary data element 2745C). This can occur, for example, in a context in which any such state change 2777A will trigger an invocation 2684 of the second version 2550B or in which only a qualifying change 2777 or invocation 2684 will trigger the second version 2550B of the primary code sequence 2750B. For example, such qualifications may be randomized (e.g., according to a particular digit of a nonce string) or determined by one or more preferences of a user/entity 10 (or both). In some variants, one or more prior sequence versions 2550 remain available notwithstanding the introduction of the so-called "second" version 2550B. Alternatively or additionally, one or more voltage configurations 2654 on a node set 2644 of such an automation module 2634 may manifest one or more decision protocols 1536 (user preference, e.g.) by which the second version 2550B is determined among a plurality of versions that has become available.

Operation 2875 describes triggering an automatic execution of the second version of the primary code sequence by changing the first value of the intermediate data element to a second value and so as to change the output data element automatically to a second value (e.g., one or more response modules 2635 triggering a first execution 2549B of the second version 2550B of the primary code sequence 2750B as an automatic and direct conditional consequence of changing the first value 2545A of the intermediate data element 2745C to the second value 2545B). This can occur, for example, in a context in which such a response module 2635 manifests (an earlier instance of) the first value 2545A as a voltage configuration 2655 on a node set 2645 thereof and periodically or occasionally (e.g., every few minutes or seconds) compares it with a current value 2545 thereof; in which one or more response modules 2635 transmits an invocation 2684 or otherwise initiates an execution 2549B as an automatic and conditional response to detecting such changes 2777A (as any non-zero difference, e.g.), in which such an automated sequence is performed (right before or after) another automated sequence 2740C so that both occur in succession without awaiting any human involvement, in which at least some executions 2549 of a primary or other code sequence 2740, 2750 would otherwise need to await a manual invocation 2684 by an authorized human user/entity 10, and in which particular multi-stage series of code sequence executions 2549 would otherwise be unsuitable for such incremental stage-wise progress toward a cascaded automatic operational sequence 2686. In some contexts, for example, automating a given manual sequence 2740B adjacent more than two automated sequences allows the creation of an automated execution sequence 2686 of four or more stages.

FIG. 29 depicts a security implementation flow 2900 in which one or more improved technologies may be incorporated. As shown operation 2910 may be performed by one or more instances of association modules 2231 within which one or more corresponding voltage configurations 2251 manifest one or more records 1535 that each associate an entity identifier with an inventory 1708 or a history thereof. As shown operation 2920 may be performed by one or more instances of auditing modules 2232 within which one or more corresponding voltage configurations 2252 manifest one or more fractional probability/likelihood expression such as a normalized apportionment 2181-2183. As shown operation 2930 may be performed by one or more instances of sequencing modules 2235 within which one or more corresponding voltage configurations 2255 manifest one or more thresholds 1537 operably coupled to a comparator, optionally implemented so that OL>LL>GL>TL. As shown operation 2940 may be performed by one or more instances of thread origination modules 2234 within which one or more corresponding voltage configurations 2254 manifest one or more headers 1531 of an original thread 1530. As shown operation 2950 may be performed by one or more instances of link posting modules 2237 within which one or more corresponding voltage configurations 2257 manifest one or more appropriately authorized hyperlinks 1534. As shown operation 2960 may be performed by one or more instances of image posting modules 2238 within which one or more corresponding voltage configurations 2258 manifest one or more appropriately authorized images 1533. As shown operation 2970 may be performed by one or more instances of thread reply modules 2239 within which one or more corresponding voltage configurations 2259 manifest one or more appropriately authorized text-only replies 1532.

This can occur, for example, in a context in which an administrator of a security-enhanced social media forum could not otherwise recognize differentiating categories of potential harm as respective opportunities to balance the need for fluid and inclusive user group discussion with avoiding serious harm to the forum or its members. Members with serious cryptographic security token inventories can be relied upon, to the extent that such inventories are held for long periods, to have the inclination and perhaps even the ability to avoid introducing harmful content and to promote worthy content. Entities who merely own a large volume of utility tokens are less trustworthy even to refrain from harassment or posting illegal pornography for mischief or vengeance. By using the specific determinants described herein combining social media content type with cryptographic utility token inventory size and duration, a near real-time automated content curation (i.e., within one minute of upload) is feasible, allowing for the possibility of nearly continuous forum access for almost any user with expertise in using the cryptographic utility tokens 382.

Figure 30:
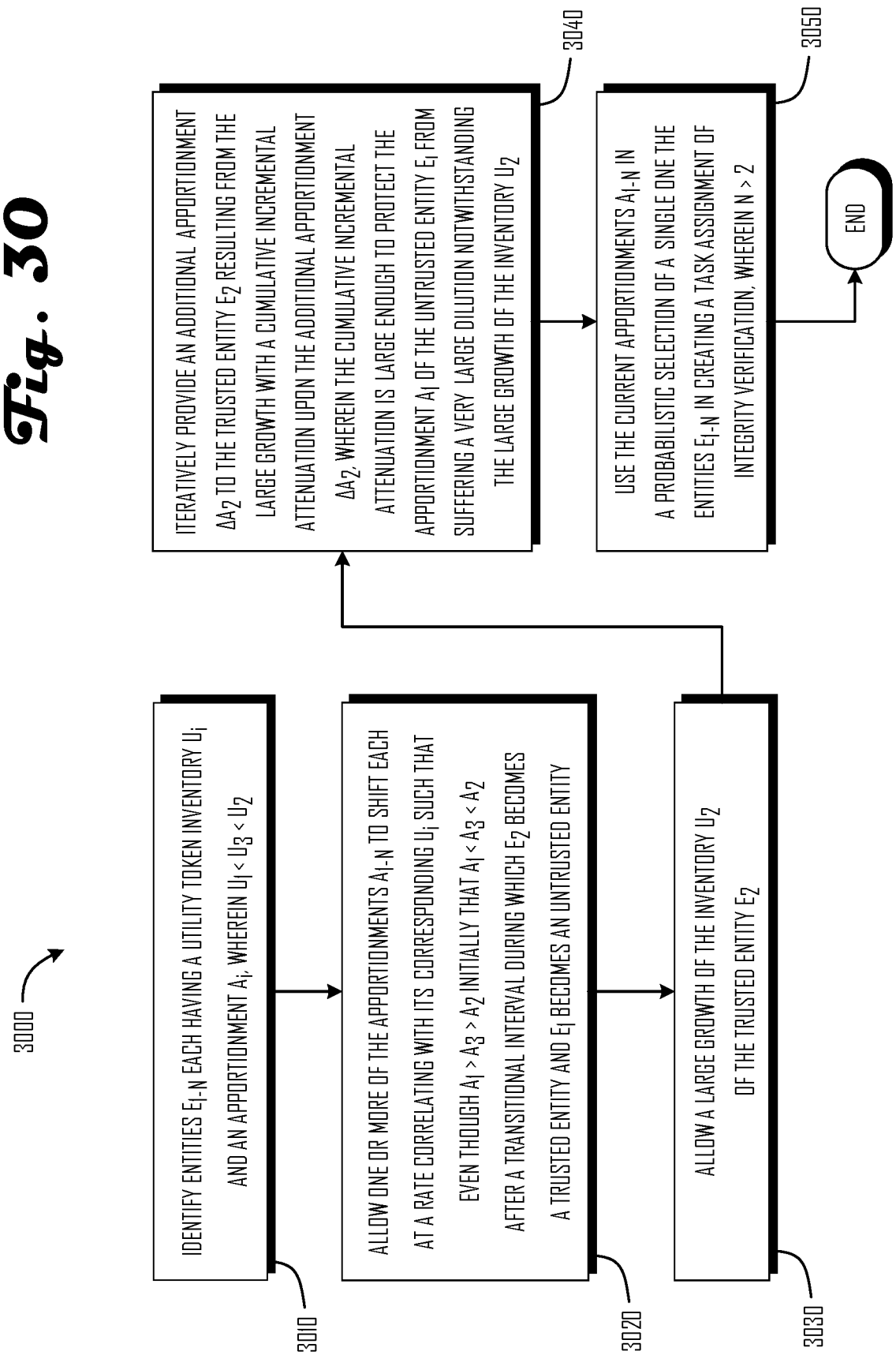
FIG. 30 depicts another operational flow in which one or more improved technologies may be incorporated for implementing fraud-resistant task delegation.

FIG. 30 depicts another security implementation flow in which one or more improved technologies may be incorporated. As shown operation 3010 may be performed by one or more instances of association modules 2231 within which one or more corresponding voltage configurations 2251 manifest one or more records 1535 that each associate an entity identifier with an inventory 1708 or a history thereof. As shown operation 3020 may be performed by one or more instances of auditing modules 2232 within which one or more corresponding voltage configurations 2252 manifest one or more fractional probability/likelihood expression such as a normalized apportionment 2181-2183. As shown, operation 3030 may be performed by one or more other instances of auditing modules 2232 within which one or more corresponding voltage configurations 2252 manifest one or more appropriately authorized text-only replies 1532. As shown operation 3040 may be performed by one or more instances of update modules 2233 within which one or more corresponding voltage configurations 2253 manifest a scalar quantification of a current inventory 1708. As shown operation 3050 may be performed by one or more instances of sequencing modules 2235 within which one or more corresponding voltage configurations 2255 manifest one or more random or pseudorandom selections 1542 (in a record 1535, e.g.).

In light of teachings herein, numerous existing techniques may be applied for configuring special-purpose circuitry or other structures effective for configuring and otherwise managing transactions and other operations as described herein without undue experimentation. See, e.g., U.S. patent Ser. No. 10/268,829 ("Security systems and methods based on cryptographic utility token inventory tenure"); U.S. patent Ser. No. 10/135,607 ("Distributed ledger interaction systems and methods"); U.S. Pat. No. 9,747,586 ("System and method for issuance of electronic currency substantiated by a reserve of assets"); U.S. Pat. No. 9,672,499 ("Data analytic and security mechanism for implementing a hot wallet service"); U.S. Pat. No. 9,646,029 ("Methods and apparatus for a distributed database within a network"); U.S. Pat. No. 9,569,771 ("Method and system for storage and retrieval of blockchain blocks using Galois fields"); U.S. Pat. No. 9,569,439 ("Context-sensitive query enrichment"); U.S. Pub. No. 20180183687 ("System and Method for Managing Services and Licenses Using a Blockchain Network; U.S. Pub. No. 20180183606 ("Verifying Authenticity of Computer Readable Information Using the Blockchain; U.S. Pub. No. 20180129955 ("Hybrid Blockchain Data Architecture for use Within a Cognitive Environment; U.S. Pub. No. 20170364698 ("Fragmenting data for the purposes of persistent storage across multiple immutable data structures; U.S. Pub. No. 20170287090 ("System and method for creating and executing data-driven legal contracts; U.S. Pub. No. 20170116693 ("Systems and Methods for Decentralizing Commerce and Rights Management for Digital Assets Using a Blockchain Rights Ledger; U.S. Pub. No. 20170109668 ("Model for Linking Between Nonconsecutively Performed Steps in a Business Process; U.S. Pub. No. 20170109639 ("General Model for Linking Between Nonconsecutively Performed Steps in Business Processes; U.S. Pub. No. 20170109638 ("Ensemble-Based Identification of Executions of a Business Process"); U.S. Pub. No. 20160260095 ("Containerized Computational Task Execution Management Using a Secure Distributed Transaction Ledger"); U.S. Pub. No. 20120095908 ("Distributed Computing for Engaging Software Services"); U.S. Pub. No. 20120020476 ("Method for Performing a Cryptographic Task in an Electronic Hardware Component"); and U.S. Pub. No. 20100332336 ("System and method for electronic wallet conversion").

In particular, numerous existing techniques may be applied for configuring special-purpose circuitry or other structures effective for determining correlations, updating trust-related indicia, allocating tasks, or other security functions as described herein without undue experimentation. See, e.g., U.S. patent Ser. No. 10/121,025 ("Content validation using blockchain"); U.S. patent Ser. No. 10/068,397 ("System and method for access control using context-based proof"); U.S. patent Ser. No. 10/063,568 ("User behavior profile in a blockchain"); U.S. patent Ser. No. 10/050,959 ("Synthetic genomic variant-based secure transaction devices, systems and methods"); U.S. Pub. No. 20180332070 ("User Behavior Profile Environment"); U.S. Pub. No. 20180300476 ("Dynamic episodic networks"); U.S. Pub. No. 20180332072 ("User Behavior Profile Including Temporal Detail Corresponding to User Interaction"); U.S. Pub. No. 20180167198 ("Trust Enabled Decentralized Asset Tracking for Supply Chain and Automated Inventory Management"); U.S. Pub. No. 20180157825 ("Systems and Methods for Determining Trust Levels for Computing Components Using Blockchain"); U.S. Pub. No. 20180097841 ("System and method for omnichannel social engineering attack avoidance"); and U.S. Pub. No. 20130061288 ("Method for controlling trust and confidentiality in daily transactions of the digital environment").

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (e.g., with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A state-change-responsive or other distributed public ledger interaction method comprising:
invoking transistor-based circuitry (e.g., one or more processing modules 2633 of transistor-based circuitry 2600) configured to obtain a first value 2555A of a first output data element 2755 (at least partly) based on a first value 2545A of a secondary (e.g., input or upstream) data element 2745C, wherein a first execution 2549A of a first version 2550A of a primary code sequence 2750A generated the first value 2555A of the first output data element 2755 (at least partly) based on the first value 2545A of the secondary data element 2745C (as a first input parameter thereof, e.g.) and wherein the first execution 2549A of the first version 2550A of the primary code sequence 2750A was configured to result from human input 2682 generated (by one or more users 10, e.g.) after the secondary data element 2745C was changed (i.e., from a different prior value 2545) to the first value 2545A of the secondary data element 2745C;
invoking transistor-based circuitry (e.g., one or more automation modules 2634 of transistor-based circuitry 2600) configured to establish an automatic second version 2550B of the primary code sequence 2750B so as to be triggered automatically by a subsequent change 2777A to the first value 2545A of the secondary data element 2745C; and
invoking transistor-based circuitry (e.g., one or more response modules 2635 of transistor-based circuitry 2600) configured to trigger a first execution 2549B of the automatic second version 2550B of the primary code sequence 2750B by changing the first value 2545A of the secondary data element 2745C to a second value 2545B of the secondary data element 2745C (as a first input 2682 of the primary code sequence 2750B, e.g.) and so as to change the first value 2555A of the first output data element 2755 to the second value 2555B of the output data element 2755.

2. A distributed public ledger interaction method comprising:
invoking transistor-based circuitry (e.g., one or more processing modules 2633 of transistor-based circuitry 2600) configured to obtain a first value 2545A of a secondary data element 2745C;
invoking transistor-based circuitry (e.g., one or more automation modules 2634 of transistor-based circuitry 2600) configured to establish a new (at least partly) automatic version 2550B of the primary code sequence 2750B so as to be triggered automatically by a subsequent change 2777A to the first value 2545A of the secondary data element 2745C; and
invoking transistor-based circuitry (e.g., one or more response modules 2635 of transistor-based circuitry 2600) configured to trigger a first execution 2549B of the automatic version 2550B of the primary code sequence 2750B by changing the first value 2545A of the secondary data element 2745C to a second value 2545B of the secondary data element 2745C (as a first input 2682 of the primary code sequence 2750B, e.g.) and so as to change the first value 2555A of the first output data element 2755 to the second value 2555B of the output data element 2755.

3. A distributed public ledger interaction method comprising:
invoking transistor-based circuitry (e.g., one or more sequencing modules 1331) configured to record one or more (device-executable code components 630, service version identifiers 641, terms version identifiers 642, or other) elements 685B of a first version 631 of a first smart contract (e.g., comprising an instance of device-executable code component 630) privately (e.g., on one or more secure servers 500B) on a first private ledger node (e.g., node 180); and
invoking transistor-based circuitry (e.g., one or more sequencing modules 1332) configured to execute the first version 631 of the first smart contract (e.g., 1) so as to retrieve first public ledger node data (e.g., comprising one or more elements 685A of block 677A) in a first public ledger node (e.g., comprising a public blockchain or other distributed ledger node 170) by executing the first version 631 of the first smart contract using one or more parameters 634 that identify both the first public ledger node (e.g., node 170) and the first public ledger node data (e.g., comprising elements 685A) to be retrieved and (2) so as to configure a second smart contract 625 (e.g., comprising a data-transformative instruction set or some other instance of a device-executable code component 630) to include a first transaction that is partly based on the first public ledger node data from the first public ledger node (e.g., particular elements 685A of node 170) and partly based on a first attribute of a public ledger destination (e.g., an address of node 170 or format requirement of node 190) and (3) so as to implement the first transaction of the second smart contract partly based on the first public ledger node data from the first public ledger node and partly based on the public ledger destination.

4. The method of Clause 3 that also implements Clause 1 in one or more smart contracts that include the first smart contract.

5. The method of Clause 3 that also implements Clause 2 in one or more smart contracts that include the first smart contract.

6. The method of Clause 3 wherein a public ledger destination thereof identifies a first public ledger node.

7. The method of Clause 3 wherein a public ledger destination thereof identifies a first public ledger node and wherein a public ledger destination thereof identifies a second public ledger node.

8. The method of Clause 3 wherein a distributed ledger destination thereof implements a serverless architecture blockchain platform.

9. The method of Clause 3 wherein a public ledger destination thereof identifies a first public ledger node and a second public ledger node.

10. The method of ANY one of the above method clauses, comprising:
invoking transistor-based circuitry (e.g., one or more authorization modules 2633 of transistor-based circuitry 2600 that is included and) configured to associate a first cryptographic token transfer 2674 with a privilege 2672 to change a first value 2545A of a secondary data element 2745C (e.g., to another value 2545 thereof).

11. The method of ANY one of the above method clauses, comprising:
installing a last-written version 2550 of a primary code sequence 2750 that implements a level of incremental load-sharing between that last-written sequence version 2550 and one or more other code sequence versions 2550.

12. The method of ANY one of the above method clauses, comprising:
installing an automatic version 2550B of a primary code sequence 2750 so as to generate at least one output value 2555B partly based on one or more input values 2535A-D not available to a prior version 2550A and partly based on an (unchanged or other) input value 2545B previously used by a prior version 2550A

13. The method of ANY one of the above method clauses, comprising:
invoking an earlier-installed version 2550 of a primary code sequence 2750 after installing an automatic version 2550B of the primary code sequence 2750.

14. The method of ANY one of the above method clauses, comprising:
installing an automatic version 2550B of a primary code sequence 2750 so as to disable a prior version 2550A of the primary code sequence 2750.

15. The method of ANY one of the above method clauses, comprising:
replacing and disabling an automatic version 2550B of a primary code sequence 2750 with another version 2550 of the primary code sequence 2750 and thereafter invoking a prior version 2550A of the primary code sequence 2750.

16. The method of ANY one of the above method clauses, comprising:
implementing a smart contract 625 as a component of a prior version 2550A of a primary code sequence 2750A.

17. The method of ANY one of the above method clauses, comprising:
implementing one or more smart contracts 625 as an entirety of a prior version 2550A of a primary code sequence 2750B.

18. The method of ANY one of the above method clauses, comprising:
implementing a smart contract 625 as a component of an automatic version 2550B of a primary code sequence 2750A.

19. The method of ANY one of the above method clauses, comprising:
implementing one or more smart contracts 625 as an entirety of an automatic version 2550B of a primary code sequence 2750B.

20. The method of ANY one of the above method clauses, comprising:
transmitting a request to one or more human individuals describing an item of information;
receiving an item of information from one or more individuals;
(after subsequently receiving an item of information, requesting or otherwise) causing a performance of one or more protocols including a validation protocol upon an item of information; and
triggering an execution of an automatic version 2550B of a primary code sequence 2750B by changing a first value 2545A of a secondary data element 2745C as a conditional response to an item of information satisfying a validation protocol.

21. The method of ANY one of the above method clauses, comprising:
transmitting a request to one or more human individuals describing an item of information;
receiving an item of information from one or more individuals;
causing a performance of one or more protocols including a validation protocol upon an item of information; and
triggering an execution of an automatic version 2550B of a primary code sequence 2750B by accepting an item of information as a first value 2545A of a secondary data element 2745C as a conditional response to a determination that an item of information satisfies a validation protocol.

22. The method of ANY one of the above method clauses, comprising:
transmitting a request to one or more human individuals describing one or more items of information;
receiving at least one of one or more items of information (directly or otherwise) from one or more human individuals;
causing a performance of one or more protocols including a validation protocol upon a at least one item of information; and
triggering an execution of an automatic version 2550B of a primary code sequence 2750B by accepting a at least one item of information as (a component of) a first value 2545A of a secondary data element 2745C as a conditional response to a determination that an item of information satisfies a validation protocol.

23. The method of ANY one of the above method clauses, comprising:
transmitting an auditory request to one or more human individuals describing one or more items of information;

receiving at least one of one or more items of information as an utterance from one or more human individuals;

causing a performance of one or more protocols including a validation protocol upon a at least one item of information; and triggering an execution of an automatic version 2550B of a primary code sequence 2750B by accepting a at least one item of information as (a component of) a first value 2545A of a secondary data element 2745C as a conditional response to a determination that an item of information satisfies a validation protocol.

24. The method of ANY one of the above method clauses, comprising:

transmitting an emailed request to one or more human individuals describing one or more items of information;

receiving at least one of one or more items of information as a textual reply from one or more human individuals;

causing a performance of one or more protocols including a validation protocol upon a at least one item of information; and triggering an execution of an automatic version 2550B of a primary code sequence 2750B by accepting a at least one item of information as (a component of) a first value 2545A of a secondary data element 2745C as a conditional response to a determination that an item of information satisfies a validation protocol.

25. The method of ANY one of the above method clauses, comprising:

iteratively monitoring one or more public ledger nodes 170, 190 for one or more requester-specified phenomena of interest, wherein one or more requester-specified phenomena of interest include one or more human-user-provided inputs 2682 upon which all of a data element are (at least partly) based.

26. The method of ANY one of the above method clauses, further comprising:

transmitting a result of a smart contract execution 2649 to a cryptographically secured handheld digital wallet 366 (like that of FIG. 3, e.g.).

27. The method of ANY one of the above method clauses, further comprising:

implementing an interchain interaction system having a smart contracts 625 as (at least) a component of each of a versions 2550 of a primary code sequence 2750A.

28. The method of ANY one of the above method clauses, further comprising:

implementing an interchain interaction system using a media-resident record list 700 (like that of FIG. 7, e.g.) as a first value 2545A of a secondary data element 2745C to characterize respective human entities 10.

29. The method of ANY one of the above method clauses, further comprising:

implementing an interchain interaction system using a media-resident record list 800 like that of FIG. 8 to characterize respective version-controlled types of first and second versions of a primary code sequence 2750B (as code components 630, e.g.).

30. The method of ANY one of the above method clauses, further comprising:

implementing a conditional notification 1070 (to an entity 10B who has requested and received a service 1050 as depicted in FIG. 10, e.g.) as a component of a first execution 2549B of an automatic version 2550B of a primary code sequence 2750B.

31. The method of ANY one of the above method clauses, comprising:

implementing a scoring system to imbue an entity 10A (e.g., an entity who supplied a code component as depicted in FIGS. 11-12) with an evaluation of trustworthiness (e.g., quantified as a current score 855 or other apportionment 1801-1803, 2181-2183) growing with time 1805 at a (net effective nominal) rate 1707 that depends upon a component of a cryptographic utility token inventory 1708 of an entity 10A, wherein an input data element 2735 thereof includes an evaluation of trustworthiness.

32. The method of ANY one of the above method clauses, comprising:

invoking transistor-based circuitry (e.g., an instance of one or more authorization modules 2633 of transistor-based circuitry 2600) configured to associate a first cryptographic token transfer 2674 with a change 2777A to a first value 2545A of a secondary data element 2745C (e.g., to a second value 2545B thereof).

33. The method of ANY one of the above method clauses, comprising:

invoking transistor-based circuitry (e.g., one or more authorization modules 2633 of transistor-based circuitry 2600) configured to associate a first cryptographic token transfer 2674 with a change 2777A to a first value 2545A of a secondary data element 2745C prospectively (e.g., more than one hour before a change 2777A to a first value 2545A of a secondary data element 2745C).

34. The method of ANY one of the above method clauses, comprising:

invoking transistor-based circuitry (e.g., one or more authorization modules 2633 of transistor-based circuitry 2600) configured to associate a first cryptographic token transfer 2674 with a privilege 2672 to change a first value 2545A of a secondary data element 2745C (e.g., to another value 2545 thereof).

35. The method of ANY one of the above method clauses, comprising:

invoking transistor-based circuitry (e.g., an instance of one or more authorization modules 2633 of transistor-based circuitry 2600) configured to associate a first cryptographic token transfer 2674 with a privilege 2672 to change a first value 2545A of a secondary data element 2745C prospectively (e.g., more than one hour before a particular change 2777A to a first value 2545A of a secondary data element 2745C).

36. The method of ANY one of the above method clauses, comprising:

invoking transistor-based circuitry (e.g., one or more detection modules 2631 of transistor-based circuitry 2600) configured to obtain a first value 2545 of an intermediate data element 2745 as an output 2689 from a secondary code sequence 2740A-C (at least partly) based on a first value 2535 of an input data element 2735, wherein an intermediate data element 2745 is a secondary data element 2745C.

37. The method of ANY one of the above method clauses, comprising:

invoking transistor-based circuitry (e.g., an instance of one or more detection modules 2631 of transistor-based circuitry 2600) configured to obtain a first value 2545A of an intermediate data element 2745C as an output 2689 from at least a first execution 2549 of a first version 2540A of a secondary code sequence 2740C based on a first value 2535A of an input data element 2735, wherein an intermediate data element 2745C is a secondary data element 2745C.

38. The method of ANY one of the above method clauses, wherein a positive (fractional, plural, or other) transfer 2674 of at least one (type of) cryptographic utility tokens 382 occurs as a component of an execution 2549 of one or more smart contracts 625 triggered by changing a first value 2545A of a secondary data element 2745C to a second value 2545B of a secondary data element 2745C.

39. The method of ANY one of the above method clauses, wherein an automatic version 2550B of a primary code sequence 2750B comprises one or more smart contracts and wherein an execution one or more smart contracts 625 is triggered by changing a first value 2545A of a secondary data element 2745C to a second value 2545B of a secondary data element 2745C.

40. The method of ANY one of the above method clauses, comprising:

implementing a scoring system to imbue at least one of a code sequences 2740, 2750 with an evaluation of trustworthiness (e.g., quantified as a current score 855) growing with time at a (net effective nominal) rate 1707 that depends upon a component of an inventory 1708 of an entity 10A who supplied a code component as depicted in FIGS. 11-12.

41. The method of ANY one of the above method clauses, wherein (at least) an automatic version 2550B of a primary code sequence 2750B comprises one or more smart contracts 625 and wherein a first execution 2549B of an automatic version 2550B of the primary code sequence 2750B comprises executing one or more smart contracts 625.

42. The method of ANY one of the above method clauses, wherein a first execution 2549A of a prior version 2550A of a primary code sequence 2750A is manually triggered (i.e., by one or more utterances or other actions 2680 by one or more users 10).

43. The method of ANY one of the above method clauses, wherein a first execution 2549A of a prior version 2550A of a primary code sequence 2750A is manually triggered by one or more actions 2680 by one or more remote users 10.

44. The method of ANY one of the above method clauses, comprising:

triggering a first execution 2549B of an automatic version 2550B of a primary code sequence 2750B by a changing a first value 2545A of a secondary data element 2745C to a second value 2545B of the secondary data element 2745C.

45. The method of ANY one of the above method clauses, wherein a private ledger node 180 resides on one or more private servers 500B wherein one or more application-type code components 630 are configured to be initiated only by an expenditure of one or more special-purpose utility tokens 382.

46. The method of ANY one of the above method clauses, wherein at least one of one or more special-purpose utility tokens 382 determine one or more elements 685B (e.g., an embedded license term defining a request format or smart contract initiation protocol) that a request 1045 must contain before a particular service 1050 identified by a request may be received.

47. The method of ANY one of the above method clauses, wherein invoking transistor-based circuitry configured to execute a first version 631 of a first smart contract comprises (at least) iteratively monitoring one or more public nodes 170 for one or more requester-specified phenomena of interest, wherein one or more requester-specified phenomena of interest include first and second asset transfers from a requester-specified digital wallet 366 with a frequency of occurrence that exceeds a requester-specified frequency threshold.

48. The method of ANY one of the above method clauses, wherein a first private ledger node resides on one or more private servers 500 configured so that one or more (e.g., instances of) code components 630 are impossible for a particular entity 10B to invoke (e.g., trigger an execution of) directly through any payment token (e.g., plentiful Bitcoin owned by a particular entity 10B and available) but in which a particular entity 10B can initiate (an execution of) at least one of one or more code components 630 by expending some number of special-purpose utility tokens 382 (e.g., a quantity of "Dragons" as described below) owned by a particular entity 10B.

49. The method of ANY one of the above method clauses, wherein a second smart contract 625 is a data-transformative instruction set.

50. The method of ANY one of the above method clauses, wherein a second smart contract 625 contains a special-purpose license that is maintained on a public ledger destination via a consensus-based distributed authentication protocol (e.g., in a block of a blockchain), wherein a special-purpose license is configured to control access to another (instance of) code component 630.

51. The method of ANY one of the above method clauses, wherein a public ledger destination maintains a rights provenance for a particular execution of a first smart contract (e.g., as version identifiers or other elements 685A).

52. The method of ANY one of the above method clauses, wherein one or more elements 685B of a first version 631 of a first smart contract comprise a movement of one or more special-purpose utility tokens 382 (e.g., a purchase to or expenditure from a digital wallet 366 or other inventory of a single private entity).

53. The method of ANY one of the above method clauses, wherein invoking transistor-based circuitry configured to execute a first version 631 of a first smart contract (occurs and) comprises:

transmitting a result of a first transaction of a second smart contract (e.g., transaction 241) partly based on a first public ledger node data from a first public ledger node and partly based on a public ledger destination being implemented to one or more mining rig nodes 400G-H.

54. The method of ANY one of the above method clauses, wherein invoking transistor-based circuitry configured to execute a first version 631 of a first smart contract comprises:

accepting an expenditure of a utility token 382 belonging to an entity 10B who transmitted a request 1045 for an execution of a first smart contract that is conditional upon a request 1045 being granted, wherein a utility token 382 contains an embedded license term defining a smart contract initiation protocol that must be used for a request 1045 to be granted.

55. The method of ANY one of the above method clauses, wherein invoking transistor-based circuitry configured to execute a first version 631 of a first smart contract comprises:

accepting an expenditure of a utility token 382 belonging to an entity 10B who transmitted a request 1045 for an execution of a first smart contract that is conditional upon a request 1045 being granted, wherein a utility token 382 contains an embedded license term defining a smart contract initiation protocol that includes a particular request format that must be used for a request 1045 to be granted.

56. The method of ANY one of the above method clauses, wherein invoking transistor-based circuitry configured to execute a first version 631 of a first smart contract comprises:

accepting an expenditure of a utility token 382 belonging to an entity 10B who transmitted a request 1045 for an execution of a first smart contract that is conditional upon a request 1045 being granted, wherein a utility token 382 contains an embedded license term defining a smart contract initiation protocol that must be used for a request 1045 to be granted, and wherein a stateless protocol is used as a smart contract initiation protocol.

57. The method of ANY one of the above method clauses, wherein invoking transistor-based circuitry configured to execute a first version 631 of a first smart contract comprises:
accepting an expenditure of a utility token 382 belonging to an entity 10B who transmitted a request 1045 for an execution of a first smart contract that is conditional upon a request 1045 being granted, wherein a utility token 382 contains an embedded license term defining a smart contract initiation protocol that must be used for a request 1045 to be granted, and wherein a Representation State Transfer protocol is used as a smart contract initiation protocol.

58. The method of ANY one of the above method clauses, wherein invoking transistor-based circuitry configured to execute a first version 631 of a first smart contract comprises:
iteratively monitoring one or more public nodes 170 for one or more requester-specified phenomena of interest, wherein one or more requester-specified phenomena of interest include first and second asset transfers from a requester-specified digital wallet 366.

59. The method of ANY one of the above method clauses, wherein invoking transistor-based circuitry configured to execute a first version 631 of a first smart contract comprises:
iteratively monitoring one or more public nodes 170 for one or more requester-specified phenomena of interest, wherein one or more requester-specified phenomena of interest include first and second asset transfers from a requester-specified digital wallet 366 with a frequency of occurrence that exceeds a requester-specified frequency threshold.

60. The method of ANY one of the above method clauses, wherein a first private ledger node 180 resides on one or more private servers 500B wherein one or more (instances of) application-type code components 630 are configured to be initiated only by an expenditure of one or more special-purpose utility tokens 382 (and not by any conventional cryptocurrency).

61. The method of ANY one of the above method clauses, wherein a first private ledger node 180 resides on one or more private servers 500B wherein one or more (instances of) application-type code components 630 are configured to be initiated only by an expenditure of one or more special-purpose utility tokens 382 (and not by any conventional cryptocurrency).

62. The method of ANY one of the above method clauses, wherein invoking a transistor-based circuitry configured to record one or more elements 685B of a first version 631 of a first smart contract comprises:
recording an entirety of a first version 631 of a first smart contract with metadata describing a first version 631 of a first smart contract all in a single block of a first private ledger node 170, wherein a metadata includes an alphanumeric identifier 632 of a first smart contract, wherein a metadata includes a then-current score 633 of a first smart contract, wherein a metadata includes a natural language description of one or more parameters 634 with which a first smart contract may be executed, and wherein a metadata includes a required tier 742 or other quantification that a requester must satisfy to be eligible to initiate an execution of a first smart contract.

63. The method of ANY one of the above method clauses, wherein invoking transistor-based circuitry configured to execute a first version 631 of a first smart contract comprises:
iteratively executing a first transaction of a second smart contract on an ongoing periodic basis.

64. The method of ANY one of the above method clauses, wherein invoking transistor-based circuitry configured to execute a first version 631 of a first smart contract comprises:
iteratively executing a first transaction of a second smart contract on an ongoing periodic basis with a frequency greater than once per week.

65. The method of ANY one of the above method clauses, wherein invoking transistor-based circuitry configured to execute a first version 631 of a first smart contract comprises:
iteratively executing a first transaction of a second smart contract on an ongoing periodic basis with a frequency greater than once per day.

66. The method of ANY one of the above method clauses, wherein invoking transistor-based circuitry configured to execute a first version 631 of a first smart contract comprises: iteratively monitoring one or more public ledger nodes 170, 190 for one or more requester-specified phenomena of interest.

67. The method of ANY one of the above method clauses, wherein invoking transistor-based circuitry configured to execute a first version 631 of a first smart contract comprises:
iteratively monitoring one or more public ledger nodes 170, 190 for one or more requester-specified phenomena of interest, wherein one or more requester-specified phenomena of interest include a transaction pertaining to a requester-specified digital wallet 366.

68. The method of ANY one of the above method clauses, wherein invoking transistor-based circuitry configured to execute a first version 631 of a first smart contract comprises:
iteratively monitoring one or more public ledger nodes 170, 190 for one or more requester-specified phenomena of interest, wherein one or more requester-specified phenomena of interest include first and second asset transfers from a requester-specified digital wallet 366.

69. The method of ANY one of the above method clauses, wherein invoking transistor-based circuitry configured to execute a first version 631 of a first smart contract comprises:
iteratively monitoring one or more public ledger nodes 170, 190 for one or more requester-specified phenomena of interest, wherein one or more requester-specified phenomena of interest include first and second asset transfers from a requester-specified digital wallet 366 with a frequency of occurrence that exceeds a requester-specified frequency threshold (e.g., daily).

70. The method of ANY one of the above method clauses, wherein a Dragon™ token is used as a utility token 382 so as to invoke (an execution of) a first version 631 of a first smart contract.

71. The method of ANY one of the above method clauses, wherein a Dragon™ token is used as a utility token 382 so as to invoke a first transaction of a second smart contract.

72. The method of ANY one of the above method clauses, wherein each expenditure of one or more utility tokens 382 by an entity 10A who supplies a first smart contract increases a time interval 991, 1291 until that entity obtains an eligibility 745, 746.

73. The method of ANY one of the above method clauses, wherein each expenditure of one or more utility tokens 382 by an entity 10B who requests a service 1050 that includes executing a first smart contract increases a time interval 991, 1291 until that entity obtains an eligibility 745, 746.

74. The method of ANY one of the above method clauses, wherein each expenditure of one or more utility tokens 382 by an entity 10A who supplies a (code component 630 or other) content component 640 increases a time interval 991, 1291 until a content component 640 obtains an eligibility (e.g., becoming associated with an affirmative Boolean indication of suitability 856).

75. A distributed public ledger interaction system comprising:

transistor-based circuitry (e.g., one or more processing modules 2633 of transistor-based circuitry 2600) configured to obtain a first value 2555A of a first output data element 2755 (at least partly) based on the first value 2545A of the secondary data element 2745C, wherein a first execution 2549A of a first version 2550A of a primary code sequence 2750A generated the first value 2555A of the first output data element 2755 (at least partly) based on the first value 2545A of the secondary data element 2745C (as a first input parameter thereof, e.g.) and wherein the first execution 2549A of a prior version 2550A of the primary code sequence 2750A was configured to result from human input 2682 generated (by one or more users 10, e.g.) after the secondary data element 2745C was changed (i.e., from a different prior value 2545) to the first value 2545A of the secondary data element 2745C;

transistor-based circuitry (e.g., one or more automation modules 2634 of transistor-based circuitry 2600) configured to establish an automatic version 2550B of the primary code sequence 2750B so as to be triggered automatically by a subsequent change 2777A to the first value 2545A of the secondary data element 2745C; and transistor-based circuitry (e.g., one or more response modules 2635 of transistor-based circuitry 2600) configured to trigger a first execution 2549B of the automatic version 2550B of the primary code sequence 2750B by changing the first value 2545A of the secondary data element 2745C to the second value 2545B of the secondary data element 2745C (as a first input 2682 of the primary code sequence 2750B, e.g.) and so as to change the first value 2555A of the first output data element 2755 to the second value 2545B of the output data element 2755.

76. The system of ANY one of the above system clauses, wherein (at least) the automatic version 2550B of the primary code sequence 2750B comprises one or more smart contracts 625.

77. The system of ANY one of the above system clauses, wherein the first and second versions 2550A-B of the primary code sequence 2750B each comprise one or more smart contracts 625.

78. The system of ANY one of the above system clauses, wherein the first and second versions 2550A-B of the primary code sequence 2750B each comprise the same one or more smart contracts 625.

79. The system of ANY one of the above system clauses, wherein (at least an instance of) the automatic version 2550B of the primary code sequence 2750B is a code component 630 that resides on a private blockchain (on node 180, e.g.).

80. The system of ANY one of the above system clauses, wherein a direct or other hash function of (at least a portion of) the automatic version 2550B of the primary code sequence 2750B resides on a public blockchain (on node 170, e.g.).

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A transistor-based distributed ledger interaction method comprising:

invoking transistor-based circuitry configured to obtain a first value of a first quantified user-identified variable, wherein said first quantified user-identified variable is obtained as an upstream data element output from a first version of an upstream code sequence based on a first value of an input data element;

invoking transistor-based circuitry configured to obtain a first value of a first output data element based on said first value of said first quantified user-identified variable, wherein a manually triggered first execution of a first version of a primary code sequence generated said first value of said first output data element based on said first value of said first quantified user-identified variable and wherein said first execution of said first version of said primary code sequence was configured to result from human input generated after said first quantified user-identified variable was changed to said first value of said first quantified user-identified variable;

invoking transistor-based circuitry configured to establish a particular second version of said primary code sequence so as to be triggered automatically by a subsequent change to said first value of said first quantified user-identified variable;

invoking transistor-based circuitry configured to trigger a first execution of said particular second version of said primary code sequence by changing said first value of said first quantified user-identified variable to a second value of said first quantified user-identified variable and so as to change said first value of said first output data element to said second value of said output data element; wherein said particular second version of said primary code sequence comprises one or more smart contracts; wherein an execution of said one or more smart contracts is triggered by changing said first value of said first quantified user-identified variable to said second value of said first quantified user-identified variable; and wherein a cryptographic utility token transfer occurs as a component of said execution of said one or more smart contracts triggered by changing said first value of said first quantified user-identified variable to said second value of said first quantified user-identified variable.

2. The transistor-based distributed ledger interaction method of claim 1, comprising:

installing a last-written version of said primary code sequence that implements a level of incremental load-sharing between that last-written sequence version and one or more other code sequence versions.

3. The transistor-based distributed ledger interaction method of claim 1, comprising:
invoking transistor-based circuitry configured to associate a first cryptographic token transfer with a privilege to change said first value of said first quantified user-identified variable prospectively.

4. A transistor-based distributed ledger interaction method comprising:
invoking transistor-based circuitry configured to obtain a first value of a first output data element based on a first value of an upstream data element;
invoking transistor-based circuitry configured to establish a first version of a primary code sequence so as to be triggered automatically by a subsequent change to said first value of said upstream data element;
invoking transistor-based circuitry configured to trigger a first execution of said first version of said primary code sequence by changing said first value of said upstream data element to a second value of said upstream data element and so as to change said first value of said first output data element to said second value of said output data element, wherein said first version of said primary code sequence comprises one or more smart contracts and wherein an execution of said one or more smart contracts is triggered by changing said first value of said upstream data element to said second value of said upstream data element; and
installing a second version of said primary code sequence and at least one of (1) invoking said second version of said primary code sequence as a replacement of said first version of said primary code sequence or (2) implementing a level of load-sharing between said first and second versions of said primary code sequence.

5. The transistor-based distributed ledger interaction method of claim 4, comprising:
installing said second version of said primary code sequence so as to generate at least one output value partly based on one or more input values not available to said first version and partly based on an input value previously used by said first version.

6. The transistor-based distributed ledger interaction method of claim 4, comprising:
invoking an earlier-installed version of said primary code sequence after installing said second version of said primary code sequence.

7. The transistor-based distributed ledger interaction method of claim 4, comprising:
installing said second version of said primary code sequence so as to disable said first version of said primary code sequence.

8. The transistor-based distributed ledger interaction method of claim 4, comprising:
replacing and disabling said second version of said primary code sequence with a third version of said primary code sequence and thereafter invoking said first version of said primary code sequence.

9. The transistor-based distributed ledger interaction method of claim 4, comprising:
implementing a smart contract as a component of said first version of said primary code sequence; and
implementing said same smart contract as a component of said second version of said primary code sequence.

10. The transistor-based distributed ledger interaction method of claim 4, comprising:
invoking transistor-based circuitry configured to associate a first cryptographic token transfer with a change to said first value of said upstream data element.

11. The transistor-based distributed ledger interaction method of claim 4, wherein said upstream data element is an intermediate data element that includes a first quantified user-identified variable.

12. The transistor-based distributed ledger interaction method of claim 4, comprising:
transmitting a request to one or more human individuals describing an item of information;
receiving said item of information from said one or more human individuals;
performing one or more protocols including a validation protocol upon said item of information; and
automatically triggering an execution of said first version of said primary code sequence by changing said first value of said upstream data element as a conditional response to said item of information satisfying said validation protocol.

13. The transistor-based distributed ledger interaction method of claim 4, wherein triggering said first execution of said first version of said primary code sequence by changing said first value of said upstream data element to said second value of said upstream data element causes a hash function of one or more other code sequences to be generated and written as said second value of said output data element.

14. The transistor-based distributed ledger interaction method of claim 4, comprising:
implementing one or more smart contracts as an entirety of said first version of said primary code sequence; and
implementing one or more smart contracts as an entirety of said first version of said primary code sequence.

15. The transistor-based distributed ledger interaction method of claim 4, comprising:
invoking transistor-based circuitry configured to associate a first cryptographic token transfer with a privilege to change said first value of said upstream data element.

16. The transistor-based distributed ledger interaction method of claim 4, comprising:
installing a last-written version of said primary code sequence that implements said level of load-sharing between that last-written sequence version and one or more other code sequence versions.

17. The transistor-based distributed ledger interaction method of claim 4, comprising:
replacing and disabling said first version of said primary code sequence with a third version of said primary code sequence and thereafter invoking said first version of said primary code sequence.

18. The transistor-based distributed ledger interaction method of claim 4, wherein said second version of said primary code sequence is used as a replacement of said first version of said primary code sequence.

19. A transistor-based distributed ledger interaction method comprising:
causing a recordation of one or more elements of a first version of one or more first smart contracts privately on a first cryptographically authenticatable node residing on one or more servers; and
causing an execution of said one or more first smart contracts so as to retrieve first cryptographically authenticatable node data in a first cryptographically authenticatable node using one or more parameters that identify both said first cryptographically authenticatable node and said first cryptographically authenticatable node data to be retrieved and so as to configure one or more other smart contracts to include a first transaction that is partly based on said first cryptographically authenticatable node data from said first cryptographically authenticatable node and partly based on a first attribute of a distributed ledger destination and so as to implement said first transaction of said one or more other smart contracts partly based on said first cryptographically authenticatable node data from said first cryptographically authenticatable node and partly based on said distributed ledger destination, and wherein said first version of said one or more first smart contracts comprises:

accepting an expenditure of a special-purpose cryptographic utility token belonging to an entity who transmitted a request for an execution of at least one of said one or more first smart contracts, wherein said expenditure is conditional upon said request being granted, wherein said special-purpose cryptographic utility token contains an embedded license term codifying one or more requirements that a request must fulfill as a precondition to a particular service identified by said request, said embedded license term defining a stateless smart contract initiation protocol that must be used for said request to be granted, and wherein a Representation State Transfer protocol is used as said stateless smart contract initiation protocol;

iteratively monitoring one or more public nodes for one or more requester-specified phenomena of interest, wherein said one or more requester-specified phenomena of interest include first and second asset transfers from a requester-specified digital wallet; and transmitting to a public blockchain a result of said first transaction of said one or more other smart contracts partly based on said first cryptographically authenticatable node data from said first cryptographically authenticatable node and partly based on said distributed ledger destination being implemented.

20. The transistor-based distributed ledger interaction method of claim 19 wherein said execution of said one or more first smart contracts comprises:

obtaining a first value of a first output data element based on a first value of an upstream data element;

establishing a particular version of a primary code sequence so as to be triggered automatically by a subsequent change to said first value of said upstream data element; and triggering a first execution of said particular version of said primary code sequence by changing said first value of said upstream data element to a second value of said upstream data element and so as to change said first value of said first output data element to said second value of said output data element, wherein said particular version of said primary code sequence comprises one or more smart contracts and wherein an execution of said one or more smart contracts is triggered by changing said first value of said upstream data element to said second value of said upstream data element.

* * * * *